US007551629B2

(12) United States Patent
Chen et al.

(10) Patent No.: US 7,551,629 B2
(45) Date of Patent: Jun. 23, 2009

(54) METHOD AND APPARATUS FOR PROPAGATING CONTENT FILTERS FOR A PUBLISH-SUBSCRIBE NETWORK

(75) Inventors: Tsu-Wei Chen, Berkeley Heights, NJ (US); Alex W. P. Fung, South Plainfield, NJ (US); David S. Rosenblum, Orange, CA (US); Ping-Fai Yang, Berkeley Heights, NJ (US)

(73) Assignee: Precache, Inc., Bridgewater, NJ (US)

( * ) Notice: Subject to any disclaimer, the term of this patent is extended or adjusted under 35 U.S.C. 154(b) by 959 days.

(21) Appl. No.: 10/400,444

(22) Filed: Mar. 28, 2003

(65) Prior Publication Data
US 2004/0001498 A1 Jan. 1, 2004

Related U.S. Application Data

(63) Continuation-in-part of application No. 10/199,356, filed on Jul. 19, 2002, and a continuation-in-part of application No. 10/199,368, filed on Jul. 19, 2002, and a continuation-in-part of application No. 10/199,439, filed on Jul. 19, 2002, now Pat. No. 7,117,270, and a continuation-in-part of application No. 10/199,369, filed on Jul. 19, 2002, now Pat. No. 6,910,033, and a continuation-in-part of application No. 10/199,388, filed on Jul. 19, 2002, now Pat. No. 7,411,954.

(60) Provisional application No. 60/447,782, filed on Feb. 19, 2003, provisional application No. 60/369,105, filed on Mar. 28, 2002.

(51) Int. Cl.
*H04L 12/56* (2006.01)

(52) U.S. Cl. .................. 370/401; 370/352; 370/392; 707/3; 707/10; 707/104.1; 709/201; 709/236

(58) Field of Classification Search .................. 370/352, 370/392, 401; 709/203, 202, 236, 201; 707/3, 707/104.1, 10
See application file for complete search history.

(56) References Cited

U.S. PATENT DOCUMENTS

| 5,893,911 | A  | * | 4/1999 | Piskiel et al. | 707/10 |
| 6,154,781 | A  | * | 11/2000 | Bolam et al. | 709/238 |
| 6,212,568 | B1 | * | 4/2001 | Miller et al. | 709/236 |
| 6,336,119 | B1 | * | 1/2002 | Banavar et al. | 707/104.1 |
| 6,643,682 | B1 | * | 11/2003 | Todd et al. | 709/202 |
| 6,728,715 | B1 | * | 4/2004 | Astley et al. | 707/10 |
| 6,839,730 | B1 | * | 1/2005 | Ramabhadran | 709/201 |

(Continued)

OTHER PUBLICATIONS

Gupta, P., et al., Algorithms for Packet Classification. IEEE Network, pp. 24-32, Mar./Apr. 2001.

(Continued)

*Primary Examiner*—Gerald Gauthier
(74) *Attorney, Agent, or Firm*—Sean Wooden; Andrews Kurth, LLP

(57) ABSTRACT

A method and apparatus provide for propagating filters in a publish-subscribe network. A plurality of filters relating to subscriptions to content in the network are received. A number of the filters is reduced based upon particular criteria, and the reduced number of filters are propagated for use in satisfying the subscriptions. A filter receiving module, a filter reduction module, and a filter propagation module may execute these steps.

49 Claims, 25 Drawing Sheets

U.S. PATENT DOCUMENTS

| | | | |
|---|---|---|---|
| 2002/0069244 A1* | 6/2002 | Blair et al. | 709/203 |
| 2003/0135553 A1* | 7/2003 | Pendakur | 709/205 |
| 2003/0154193 A1* | 8/2003 | Rosenblum | 707/3 |
| 2007/0014302 A1* | 1/2007 | Vincent | 370/401 |

OTHER PUBLICATIONS

Srinivasan, V., et al., Fast and Scalable Layer Four Switching. In Proceedings of SIGCOMM '98, pp. 191-202, 1998.

Gupta et al., Packet Classification on Multiple Fields, Proceedings of ACM SIGCOMM '99, pp. 147-160, Aug. 1999.

Lakshman, T., et al., High Speed Policy-based Packet Forwarding Using Efficient Multi-dimensional Range Matching. In Proc. ACM SIGCOMM '98, pp. 203-214, 1998.

Srinivasan, V., et al., Packet Classification using Tuple Space Search. In Proceedings of ACM SIGCOMM '99, pp. 135-146, Sep. 1999.

Adiseshu,,H., et al., Packet filter management for layer 4 switching. In Proceedings of IEEE INFOCOM, 1999.

Buddhikot, M., et al., Space decomposition techniques for fast layer-4 switching. In Proceedings of IFIP Workshop on Protocols for High Speed Networks, Salem, Massachusetts, pp. 25-41, Aug. 25-28, 1999.

Gupta et al., Packet Classification Using Hierachical Intelligent Cuttings. In Proceedings Hot Interconnects VII, Aug. 1999.

Warkhede, P.R., et al., Fast Packet Classification for Two-Dimensional Conflict-Free Filters. In Proc. INFOCOM, pp. 1434-1443, 2001.

Waldvogel, M., Multi-Dimensional Prefix Matching Using Line Search. In Proceedings of IEEE Local Computer Networks, pp. 200-207, Nov. 2000.

Eppstein, D., et al., Internet packet filter management and rectangle geometry. In Proceedings of the $12^{th}$ Annual ACM—SIAM Symposium on Discrete Algorithms (SODA 2001), pp. 827-835, Washington, DC., Jan. 2001.

Feldmann, A., Tradeoffs for packet classification. In Proc. INFOCOM, vol. 3, pp. 1193-1202. IEEE, Mar. 2000.

Woo, T., A Modular Approach to Packet Classification: Algorithms and results. In Proc. IEEE INFOCOM, Tel-Aviv, Israel, pp. 1213-1222, Mar. 2000.

Eugster, P., et al., Event Systems, How to Have Your Cake and Eat It Too, In $22^{nd}$ International Conference on Distributed Computing Systems Workshops (ICDCSW '02), Vienna, Austria, Jul. 2-5, 2002.

* cited by examiner

| 386 | 388 |
|---|---|
| 72 | Bytes in message |
| 2 | Channel ID (assumed) |
| 3001 | Publisher ID (assumed) |
| 9509384 | Publisher Session ID (assumed) |
| 39 | Sequence number (assumed) |
| 0 \| 2 | unused \| Number of subject fields |
| 0 \| 50 | Subject ID for # \| Subject ID for SUBSCRIPTION |
| 5688 \| 0 | Port number (assumed) \| Subscription ID (assumed) |
| 1 \| 4 | Number of subject filter fields \| Number of attribute tests |
| 5 \| 0 | Subject ID for > \| padding to 4 bytes |
| 0 0000000 00110 001 \| 1 0000001 01100 011 | Encoding of price >= \| Encoding of and symbol == |
| 0 0000000 00110 001 \| 1 0000010 01100 010 | Encoding of price >= \| Encoding of and volume between |
| 10 | Operand of price >= |
| 2 | Size of operand of symbol == |
| L \| U \| NUL \| NUL | Operand of symbol == (2 characters + 2 bytes padding) |
| 10 | Operand of price >= |
| 1000 | First operand of volume between |
| 10000 | Second operand of volume between |

*FIG. 18*

METHOD AND APPARATUS FOR PROPAGATING CONTENT FILTERS FOR A PUBLISH-SUBSCRIBE NETWORK

REFERENCE TO RELATED APPLICATIONS

The present application incorporates by reference and claims the priority of U.S. Provisional Application No. 60/369,105, entitled "Methods for Propagating Content Filters for a Publish/Subscribe Network," filed Mar. 28, 2002, and U.S. Provisional Application No. 60/447,782, entitled "Propagating Content Filters, Content-Based Packet Routing Using Compact Filter Storage and Off-Line Pre-computation, Reliable Publishing and Subscribing, Implementing Persistent and Reliable Message Delivery, and Implementing Query-Response Interactions By Mapping Data Advertisements as Subscriptions and Queries as Notifications in a Publish-Subscribe Network," filed Feb. 19, 2003. The present application is also a Continuation-in-Part (CIP) of U.S. patent application Ser. No. 10/199,356, entitled "Packet Routing Via Payload Inspection," U.S. patent application Ser. No. 10/199,368, entitled "Method And Apparatus For Content-Based Routing And Filtering At Routers Using Channels," U.S. patent application Ser. No. 10/199,439 now U.S. Pat. No. 7,117,270, entitled "Method For Sending And Receiving A Boolean Function Over A Network", U.S. patent application Ser. No. 10/199,369 now U.S. Pat. No. 6,910,033, entitled "Method For Storing Boolean Functions To Enable Evaluation, Modification, Reuse, And Delivery Over A Network," and U.S. patent application Ser. No. 10/199,388 now U.S. Pat. No. 7,411,954, entitled "Efficient Implementation of Wildcard Matching On Variable-Sized Fields In Connect-Based Routing," all filed Jul. 19, 2002 and all hereby incorporated by reference.

The present application also incorporates by reference the following U.S. Patent Applications, also CIPs of the above-referenced applications, filed herewith: application Ser. No. 10/400,671, entitled "Method and Apparatus for Reliable Publishing and Subscribing in an Unreliable Network," application Ser. No. 10/400,465, entitled "Method and Apparatus for Content-Based Packet Routing Using Compact Filter Storage and Off-Line Pre-computation," application Ser. No. 10/400,453, entitled "Method and Apparatus for Implementing Query-Response Interactions in a Publish-Subscribe Network," and, Application No. 60/369,832, entitled "Method and Apparatus for Implementing Persistent and Reliable Message Delivery."

BACKGROUND OF THE INVENTION

Network bandwidth is increasing exponentially. However, the network infrastructure (including routers, servers, daemons, protocols, etc.) is still using relatively old technologies. As a result, Internet applications and network routers cannot keep up with the speed of the bandwidth increase. At the same time, more and more devices and applications are becoming network enabled. The load that these devices and applications put on the network nodes have increased tremendously. The increase of network load and number of applications also makes the complexity of implementing and maintaining network applications much higher. As a result, the increase of network bandwidth and the ubiquitous use of network devices and applications can cause problems for routing and transmission of data in the old network infrastructure, particularly when publishing content to subscribers.

A model for having networks push information from servers to clients is the publish-subscribe style. In this model, the server becomes a simplified publisher of its information, without regard to which clients may be interested in that information or where they are located in the network. The clients become subscribers for information, with information delivered as it becomes available, potentially without regard to details about where in the network it was published. The network is then responsible for efficiently routing published information to subscribers, for matching information to active subscriptions, and for doing all of this in a way that is transparent to the publishers and subscribers.

Because the complexity of the server is greatly reduced in the publish-subscribe model, the distinction between a heavyweight server and a lightweight client can begin to disappear, or rather to merge into the notion of a peer that can be either publisher, or subscriber, or both. Numerous kinds of applications have a natural affinity for publish-subscribe-style interaction between peers. A common theme underlying many of these applications is that the information being published and subscribed for is in the form of events. For example, an investor-buys or sells a stock, causing the price of the stock to change. A traffic incident occurs on a freeway, causing traffic on the freeway to back up. A security hole in a software system is discovered, causing a patch to be developed for the users of the software. A player fires a weapon in an Internet game, causing another player's avatar to die. All of these exemplary phenomena are events that are potentially of interest to large numbers of subscribers and can be propagated over a network to notify those subscribers that the events happened. An event is thus simply a self-contained, succinct piece of information about something potentially interesting that happened at some point in time at some place on the network.

Another example involves a scheduled broadcast, which has differing characteristics from applications involving only asynchronous events where the time of events is unpredictable and random. First, the event is scheduled to take place at a known time. Secondly, an event does not need to be a succinct piece of information. Instead, it could be a massive amount of data. Directing this massive load of data to the parts of the network where interested subscribers are found requires substantial server processing.

Typically the server or publisher performs the routing decisions for the network in order to instruct the network on where to send published content in the publish-subscribe model. The publisher stores the subscriptions for content that it publishes. Upon receiving or generating new content, the publisher compares the content with each of the subscriptions to identify any matches. If the content (event) satisfies any subscriptions, the publisher pushes the content to the corresponding subscriber via the network. This conventional publish-subscribe model places a tremendous burden on the publishers, particular as more devices become network-enabled and as the number of subscriptions increases. A complementary approach can be just as odious—a subscriber evaluates its own subscriptions on all published events.

With greater convergence of untold numbers of applications across the Internet, the possibilities for exploiting event notification become endless. However, those possibilities require a more efficient way to make routing decisions and determine when events satisfy subscriptions, alleviating the burden on the publishers. Thus, a pervasive, persistent event notification service could provide tremendous value-added benefit for Internet applications, as well as other applications and implementations.

SUMMARY OF THE INVENTION

A method and apparatus provide for propagating filters in a publish-subscribe network. A plurality of filters relating to subscriptions to content in the network are received. A number of the filters is reduced based upon particular criteria, and the reduced number of filters are propagated for use in satisfying the subscriptions.

A method and apparatus provide for propagating filters in a publish-subscribe network. A plurality of filters are received at a node in the network. The received filters are processed to reduce the number of filters. Whether to propagate filters is determined based on recipient behavioral rules. Whether to propagate filters is determined based on sender behavioral rules. The reduced number of filters are propagated to a next node in the network.

A method and apparatus provide for filter propagation in a publish-subscribe network. A router sends (e.g., broadcasts or multicasts to selected routers) notification requesting filters. One or more routers receiving the broadcasted notification. Filters are propagated upstream in the publish-subscribe network. The propagated filters are processed to reduce the number of filters. The reduced number of filters are propagated upstream to the router requesting filters.

BRIEF DESCRIPTION OF THE DRAWINGS

The accompanying drawings are incorporated in and constitute a part of this specification and, together with the description, explain the advantages and principles of the invention.

FIG. 18 is a diagram illustrating an example of encoding of a message.

DETAILED DESCRIPTION

Overview

Figure 1:
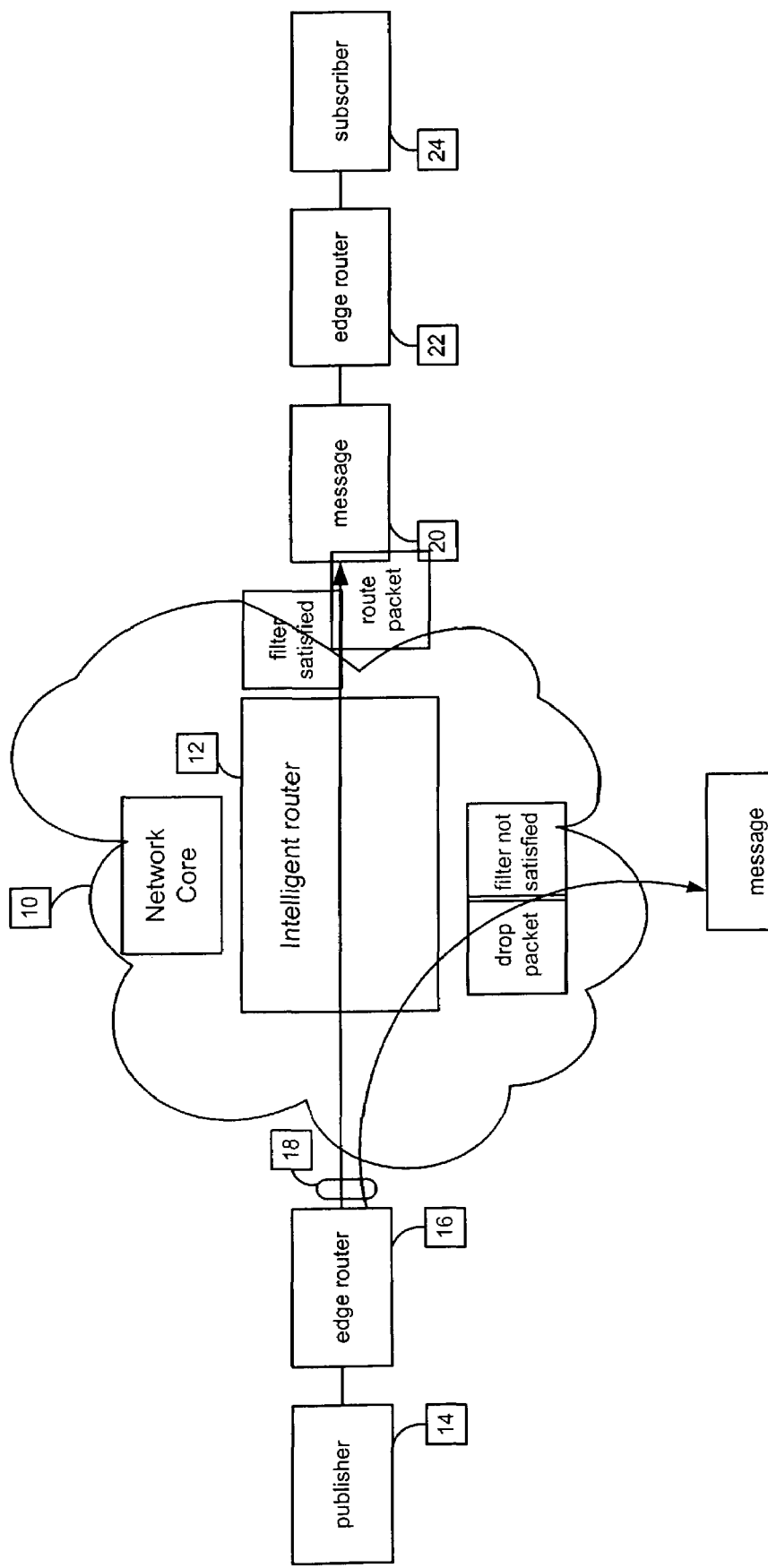
FIG. 1 is a diagram illustrating intelligent routing in a network core.

An Internet-scale, or other distributed network-scale, event notification system provides applications with a powerful and flexible realization of publish-subscribe networking. In this system, an application program uses event notification application program interfaces (APIs) to publish notifications and/ or to subscribe for and receive notifications about events occurring inside the network.

A notification in the system is given a subject, which is a string or other structure that classifies the kind of information the notification encapsulates. Also, a notification is completed with a set of attributes containing information specific to the notification. For example, an application might publish notifications about transactions on the New York Stock Exchange using the subject quotes.nyse and attributes symbol and price. The application might publish an individual notification having specific attribute values, for example with symbol equal to SNE (the stock ticker symbol for Sony Corporation) and price equal to 85.25. Most if not all of the attributes in a notification are predefined, in the sense that they are found in all notifications for the same family of subjects. However, publishers can add discretionary attributes on a per-notification or other basis in order to provide additional event-specific information. Therefore, not all or even any attributes need be predefined.

In this system, subscribers are not restricted to subscribing only for subjects or whole channels. Channels are further explained and defined below. They can include an hierarchical structure specifying, for example, a subject field and one or more levels of related sub-fields (sub-subjects). Thus, subscribers can provide much more finely-tuned expressions of interest by specifying content-based filters over the attributes of notifications. For example, a subscriber might subscribe for all notifications for the subject quotes.nyse having symbol equal to SNE and price greater than 90.00 (indicating perhaps a sell opportunity for a block of shares owned by the subscriber). All notifications matching the subscription can be delivered to the subscriber via a callback or other type of function that the subscriber provides at the time it registers its subscription or at other times. One subscription can be broken down into many filters.

The callback can perform many computations, including something as simple as writing a message to a terminal or sending an e-mail, to something more complex such as initiating the sale of a block of shares, and to something even more complex that initiates new publish-subscribe activity (for example, replacing the existing subscription with a new subscription for a buy opportunity at a price of 75.00, or publishing a new notification that the subscriber's portfolio has been modified).

Applications are aided in their publishing and subscribing activities by agents, for example. The agents can possibly make use of or be implemented with proxies. The agents, when used, provide network connectivity for outgoing notifications and subscriptions and delivery of incoming matching notifications to subscribers. Once a notification enters the network, the system's network of routers propagate the notifications to all subscribers whose subscriptions match the notification. One way of accomplishing this would be to broadcast the notification to all points of the network and then let the application agents decide whether the notification is relevant to their subscribers. However, this is not necessarily a scalable approach—the network would usually be quickly overwhelmed by the load of message traffic, especially in the presence of large numbers of active and verbose publishers. And even if sufficient bandwidth were not a problem, the subscribers would be overwhelmed by having to process so many notifications.

The system's exemplary network is much more efficient in the way it routes notifications. First, it can use multicast routing to ensure that a notification is propagated, for example, at most once over any link in the network. Second, it can employ a large number of sophisticated optimizations on filters to reduce as much as possible the propagation of notifications.

FIG. 1 is a diagram conceptually illustrating this intelligent routing in a network core. A publisher 14 transmits content in messages via an edge router 16 to a network core 10, used in a publish-subscribe network. A publish-subscribe network includes any type of network for routing data or content from publishers to subscribers. The content is transmitted via one or more channels 18 representing logical connections between routers or other devices. An intelligent router 12 in network core 10 determines whether to route or forward the message. In particular, intelligent router 12 can determine if the message includes content as subscribed to by a subscriber 24.

Each subscription encapsulates a subject filter and an attribute filter. Routers can possibly expand a subject filter to the set of matching subjects and merge attribute filters on a per-subject basis. An intelligent router evaluates the subject filter against the subject of notifications, and evaluates the attribute filter against the attribute values in notifications. The syntax for subject filters can possibly use wildcards, and the syntax for attribute filters can use Boolean expressions, both of which are further explained below. The term "filter" is used to describe a set of events that a subscriber is interested in receiving from publishers. Routing rules are generated from the filters and are used by intelligent routers to make routing decisions.

Therefore, if the entire filter set is not satisfied by a message 26, for example, intelligent router 12 drops (discards) message 26, meaning that the message is not forwarded. If any filter of the entire set is satisfied by a message 20 according to the evaluations of subject and attribute filters, for example, intelligent router 12 routes (forwards) message 20 via edge router 22 and possibly other devices to a subscriber 24, or performs other functions internal to router 12 with message 20, according to all the routing and/or action rules prescribed for the matching filter. The search will continue until either the entire set of filters has been exhausted, or decisions about all the rules have been obtained, whichever comes first.

This type of intelligent content-based routing in a network core provides for real-time data delivery of, for example, alerts and updates. Examples of real-time data delivery for alerts include, but are not limited to, the following: stock quotes, traffic, news, travel, weather, fraud detection, security, telematics, factory automation, supply chain management, and network management. Examples of real-time data delivery for updates include, but are not limited to, the following: software updates, anti-virus updates, movie and music delivery, workflow, storage management, and cache consistency. Many other applications are possible for delivery of information for subscriptions.

Table 1 illustrates storing of subscriptions with subjects and predicates for the filtering. They can be stored in any type of data structure, as desired or necessary, anywhere in the network. As explained below, the predicates are components of subscriptions. The subscriptions can be expressed in any way, examples of which are provided below.

TABLE 1

| subscription 1 | subject 1 | predicate 1 |
|---|---|---|
| ... | | |
| subscription N | subject N | predicate N |

Table 2 provides an example of a publication and subscription for a quote server. This example is provided for illustrative purposes only, and subscriptions can include any number and types of parameters for any type of data or content.

TABLE 2

| Quote Server Example | |
|---|---|
| Subject Tree | Publication |
|   Quotes.NYSE |   subject = Quotes.NYSE |
|   Quotes.AMEX |   Attributes |
|   Quotes.NASDAQ |     Symbol = SNE |
| |     Price = 51 |
| |     Volume = 1000000 |
| Attributes | Subscription |
|   Symbol |   Subject == Quotes.NYSE |
|   Price |   Filter |
|   Volume |     (Symbol == SNE) & (Price > 55) |

The predicates provide the Boolean expressions for the subscription and the subjects provide an indication of a channel for the subscription. Subscriptions can be expressed in many different ways. Use of Boolean expressions is one such example and provides an ability to easily convert the subscription into a subject filter and an attribute filter for content-based routing. Subscriptions can alternatively be expressed without reference to a subject; however, use of a subject or channel (further explained below) provides a context for interpreting and applying filters to attributes.

The routing decisions can be accomplished in the network core and distributed throughout the network, alleviating processing burdens on publisher and subscriber machines, and significantly enhancing the efficiency of the network. FIG. 1 illustrates one publisher, one subscriber, and one intelligent router for illustrative purposes only; implementations can include many publishers, subscribers, and intelligent routers. The term intelligent router refers to a router or other entity having the ability to make routing decisions by inspecting the payload of a packet or message in a network core or other locations.

Network Infrastructure

Figure 2:
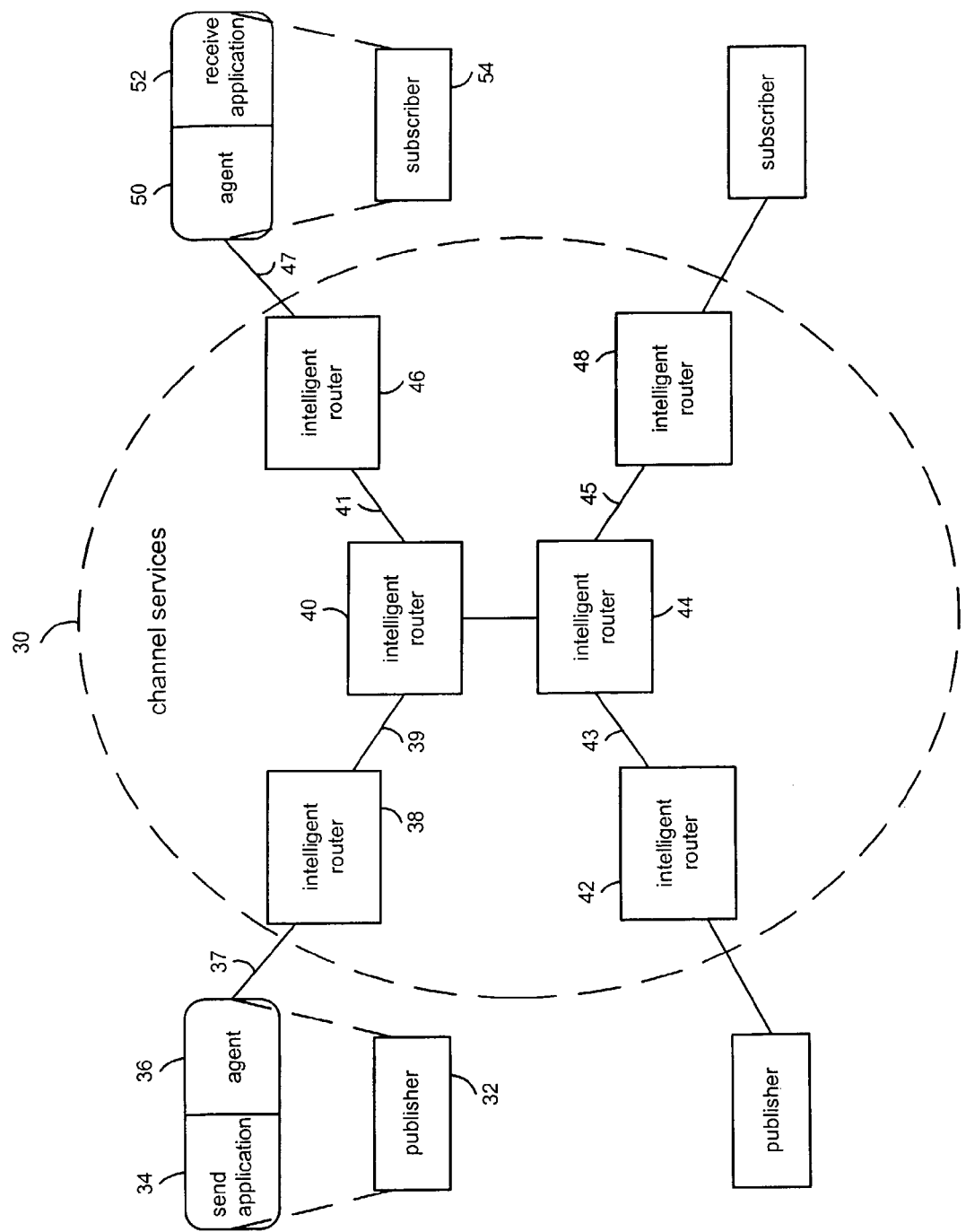
FIG. 2 is a network diagram illustrating intelligent routers for publishers and subscribers.

FIG. 2 is a network diagram illustrating intelligent routers for publishers and subscribers. A routing entity 30 providing channel services is, for example, effectively layered on a network infrastructure, as explained below, for routing messages among intelligent routers. A publisher 32 conceptually includes, for example, an application 34 to receive an indication of published content, such as a pointer for retrieving the content, and an agent 36 to encode the content for network transmission via channel services 30. A collection of logically interconnected intelligent routers 38, 40, 42, 44, 46, and 48 route the content from the publisher using routing rules generated from subject filters and attribute filters for subscriptions. A plurality of links 39, 41, 43, and 45 provide the logical connections between intelligent routers 38, 40, 42, 44, 46, and 48. Other links 37 and 47 provide, respectively, logical connections between publisher 32 and intelligent router 38, and between a subscriber 54 and intelligent router 46. Subscriber 54 includes an agent 50 to detect and receive the subscribed content, and an application 52 to present the content.

A channel can include, for example, a related set of logical multicast connections implemented in a distributed manner. A channel in this exemplary embodiment is a logically related collection of network resources used to serve a community of publishers and subscribers exchanging content. The content is classified according to the channel subject namespace, and the resources are managed, controlled, and provisioned via channel services provided by channel managers. Multiple channels may share the same resources. Channels can provide a highly scalable directory service such as, but not limited to, the following examples: publisher and subscriber information, authentication and authorization information, message types, management information, and accounting and billing information. Channels can also provide, for example, persistence through caching, a fast data delivery mechanism, security, and user and network management. Channels can be used for any other purpose as well.

The filtering by the intelligent routers can occur in a network core to distribute routing decisions. In addition, intelligent routers can also function as edge routers connecting a user device, such as a publisher or subscriber, with the network core. Also, the same device connected to the network can function as both a publisher to push content to subscribers via routing decisions in the network and as a subscriber to received pushed content. The intelligent routers and channels can be connected in any configuration, as necessary or desired for particular implementations, and the configuration shown in FIG. 2 is provided for illustrative purposes only.

Figure 3:
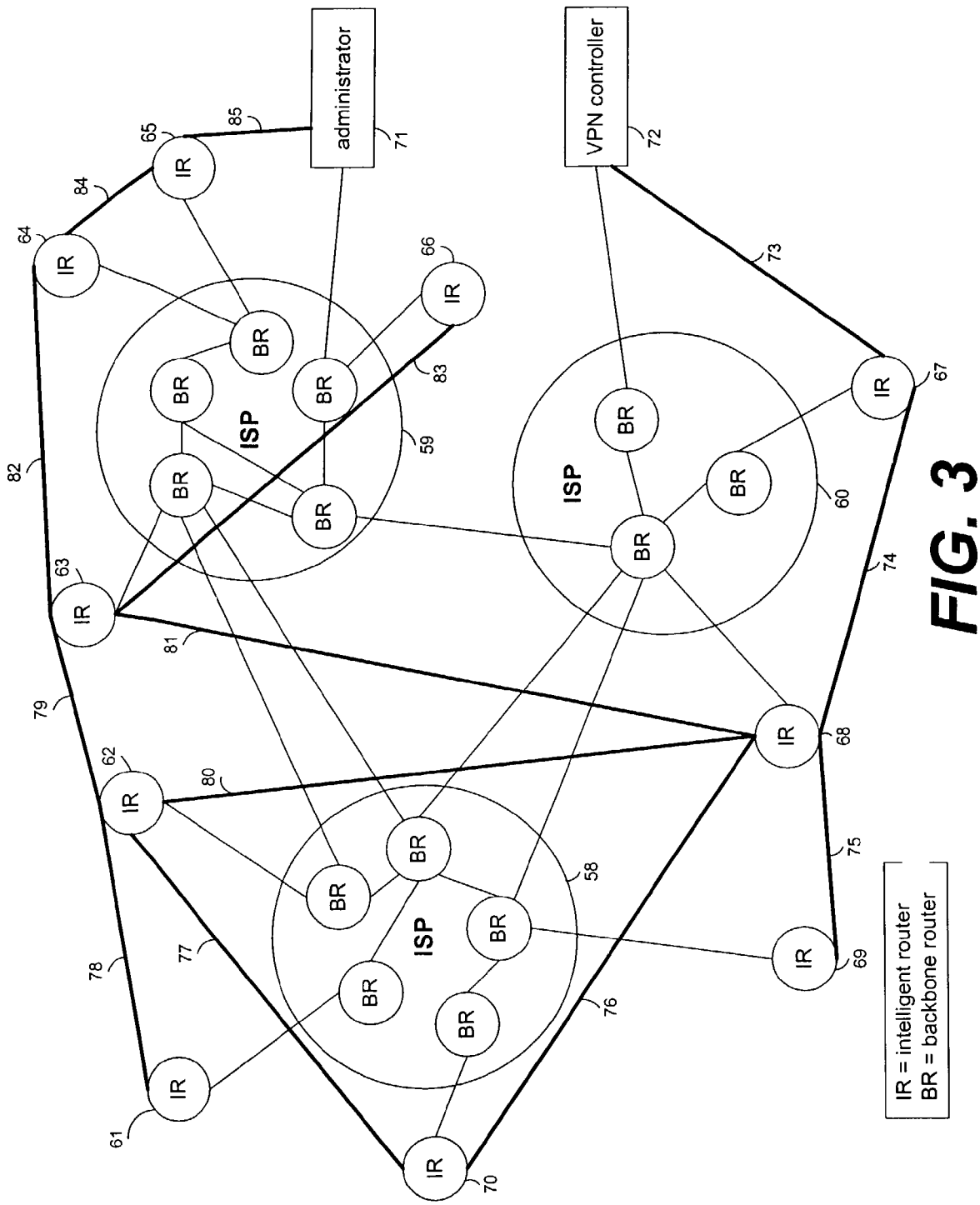
FIG. 3 is a diagram illustrating a network infrastructure for intelligent routers and backbone routers.

FIG. 3 is a diagram of an exemplary network infrastructure for intelligent routers and conventional backbone routers, also illustrating logical connections for channels. The intelligent routers in this example use existing backbone routers in the network, such as the Internet or other distributed network, and the intelligent routers are thus effectively layered on the backbone routers. In this example, Internet Service Provider (ISP) networks 58, 59, and 60 each include several backbone routers for conventional routing of messages or packets. A plurality of intelligent routers 61-70 are connected with one or more backbone routers in ISP networks 58, 59, and 60. Intelligent routers 61-70 are also interconnected by a plurality of links 73-85, representing examples of links, and can be connected to end user devices by the links as well. Intelligent routers 61-70 can be controlled by one or more administrator machines such as an entity 71, and one or more virtual private network (VPN) controllers such as an entity 72. The ISP networks 58, 59, and 60 would also be connected to publisher and subscriber machines (not shown in FIG. 3). The backbone routers in and among ISPs 58, 59, and 60 are interconnected in any conventional way within the existing network infrastructure.

The intelligent routers 61-70 and links 73-85, as illustrated, can be implemented using existing network infrastructure, and they provide for content-based routing in the network core. The links 73-85 represent logical connections between intelligent routers 61-70 and can be implemented using, for example, existing network infrastructure or other devices. A link, for example, can be implemented using a logical connection called the tunnel. A tunnel includes the hardware, and possibly software, network infrastructure for implementing a link, and one tunnel can be a component of multiple channels. The channels facilitate content-based routing in the intelligent routers by providing logical configurations for particular types of content and thus providing a context for attributes transmitted over the channels. Although intelligent routers can perform routing decisions without channels, the channels enhance the efficiency of content-based routing by the intelligent routers in the network core.

This exemplary embodiment includes use of channels and links. A link is a connection between two routers—albeit intelligent routers. A channel is a network entity encompassing a (typically large) collection of routers, configured statically or dynamically by the interconnecting links to achieve one-to-many or many-to-many logical connections. In particular, a channel is a top-level logical entity describing the essential characteristics of the channel. Under one channel, there could be many subjects. Each subject will form a sub-network (such as a multicast tree) involving a collection of interconnected routers. These subject-based sub-networks can be allocated, oriented, and configured in different manners. The channel, being a collection of all the sub-networks formed for the subjects under it, may resemble a mesh of networks, for example.

Figure 4:
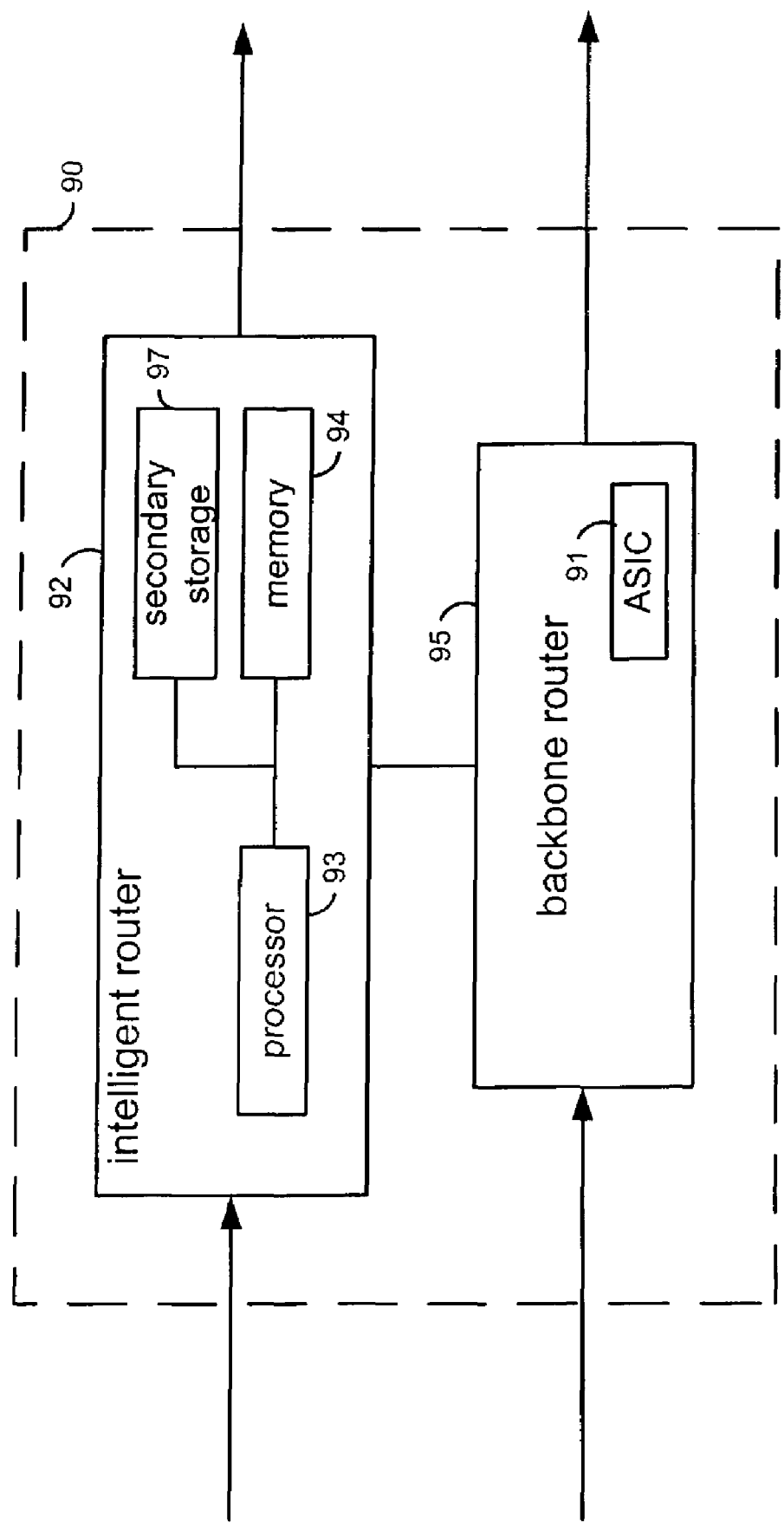
FIG. 4 is a diagram of hardware components of an intelligent router.

FIG. 4 is a diagram of exemplary hardware components of an intelligent router 92, which can correspond with any of the other referenced intelligent routers. A network node 90 can include intelligent router 92 connected with a conventional backbone router 95. Intelligent router 92 includes a processor 93 connected to a memory 94 and a secondary storage 97 (possibly implemented with a detached machine, for example), either of which can store data, as well as cache data, and store applications for execution by processor 93. Secondary storage 97 provides non-volatile storage of data. Under software control as explained below, processor 93 provides instructions to backbone router 95 for it to route (forward) or not route (discard) messages or packets based upon routing rules generated from subject filters and attribute filters for subscriptions. Although shown as implemented in a separate processor-controlled device, intelligent router 92 can alternatively be implemented in an application specific integrated circuit (ASIC) within backbone router 95 to provide the intelligent routing functions in hardware possibly with embedded software. The intelligent routing functions can also be alternatively implemented in a combination of software and hardware in one or multiple routing devices.

Figure 5:
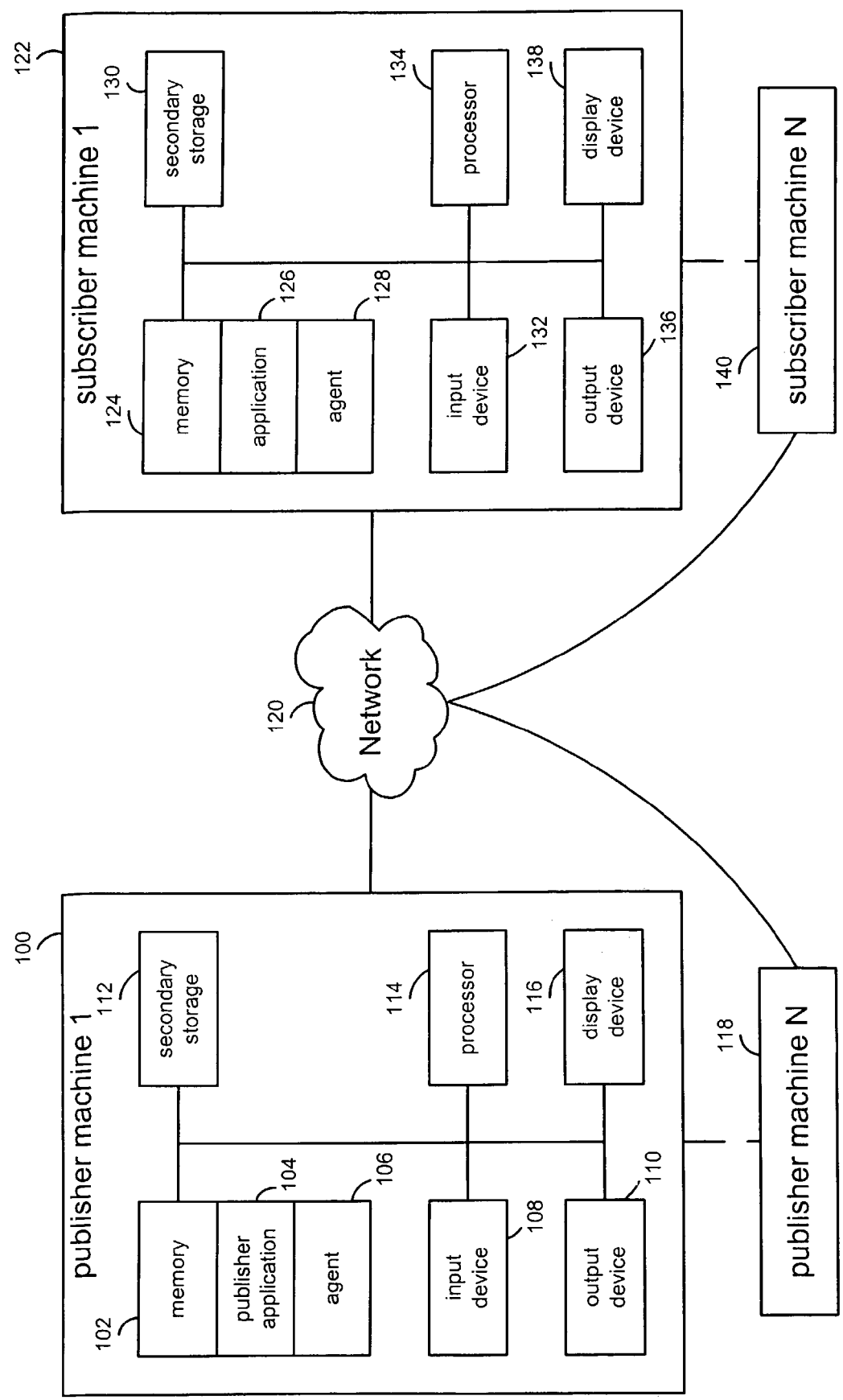
FIG. 5 is a diagram of publisher and subscriber machines.

FIG. 5 is a diagram of exemplary publisher and subscriber machines. A publisher machine 100 or 118 can include the following components: a memory 102 storing one or more publisher applications 104 and an agent application 105; a secondary storage device 112 providing non-volatile storage of data; an input device 108 for entering information or commands; a processor 114 for executing applications stored in memory 102 or received from other storage devices; an output device 110 for outputting information; and a display device 116 for providing a visual display of information.

A subscriber machine 122 or 140 can include the following components: a memory 124 storing one or more applications 126 and an agent application 128; a secondary storage device 130 providing non-volatile storage of data; an input device 132 for entering information or commands; a processor 134 for executing applications stored in memory 124 or received from other storage devices; an output device 136 for outputting information; and a display device 138 for providing a visual display of information. Publisher and subscriber machines can alternatively include more or fewer components, or different components, in any configuration.

Publisher machines 100 and 118 are connected with subscriber machines 122 and 140 via a network 120 such as the network described above. Network 120 includes intelligent routers for providing distributed routing of data or content in the network core via packets or messages. Although only two publisher and subscriber machines are shown, network 120 can be scaled to include more publisher and subscriber machines. The publisher and subscriber machines can be implemented with any processor-controlled device such as, but not limited to, the following examples: a server; a personal computer; a notebook computer; a personal digital assistant; a telephone; a cellular telephone; a pager; or other devices. Network 120 with intelligent routers can include any wireline or wireless distributed network, connecting wired devices, wireless devices, or both. Network 120 can also potentially use existing or conventional network infrastructure.

Figure 6:
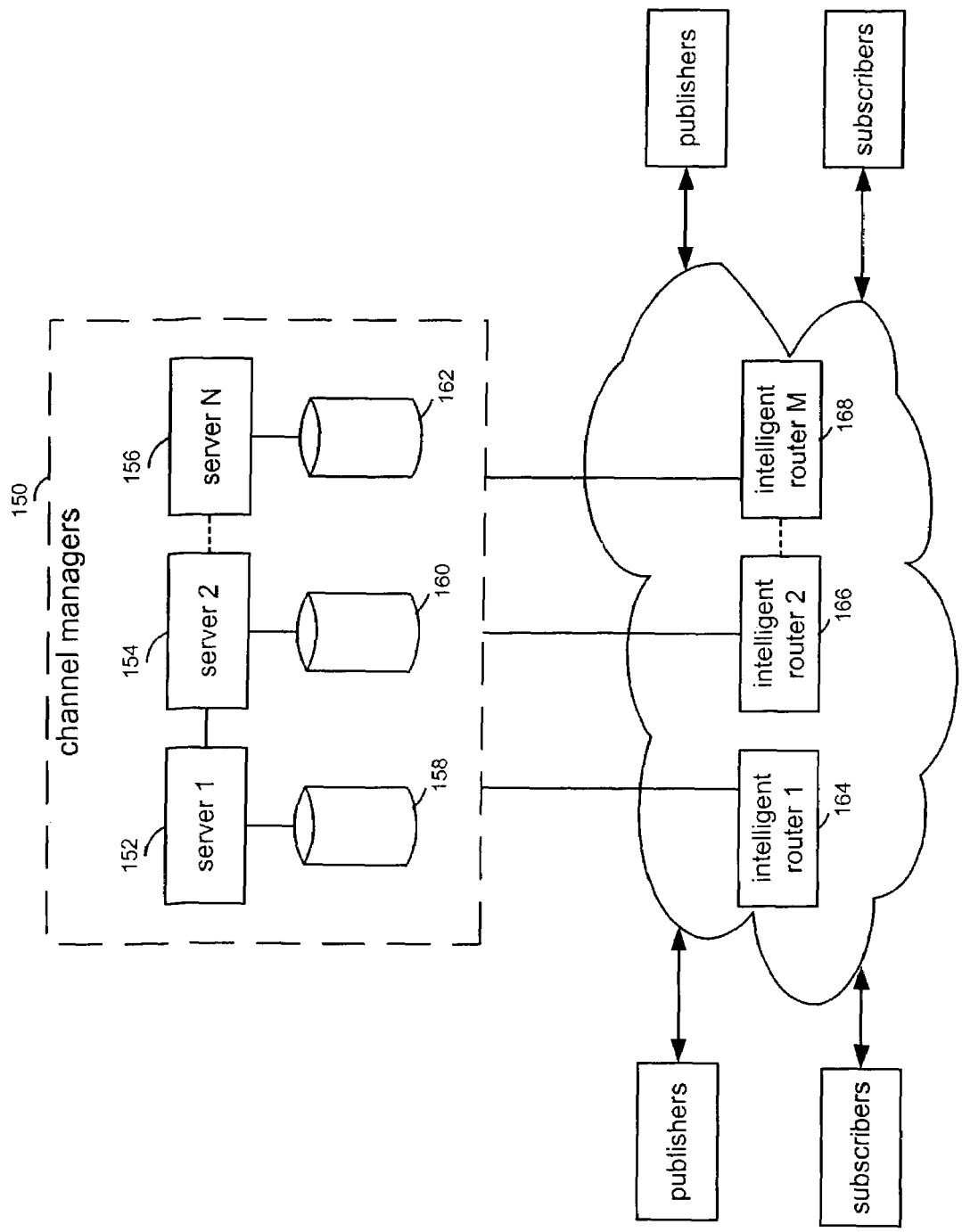
FIG. 6 is a diagram of channel managers for intelligent routers.

FIG. 6 is a diagram illustrating channel managers 150 for intelligent routers. In this example, channel managers 150 are implemented with multiple servers 152, 154, and 156. Each server includes its own local storage 158, 160, and 162. Intelligent routers 164, 166, and 168 contact channel managers for information about particular channels. The channel managers can also provide for data persistence, fail over functions, or other functions. The channel managers thus provide the channel services, which include a database or set of databases anywhere in the network specifying, for example, channel-related information, properties for data persistence, user information for publishers and subscribers, and infrastructure information. The infrastructure information can include, for example, an identification of intelligent routers and corresponding tunnels connecting them, subjects for the channels, and attributes for the channels (a name and type for each attribute). Packets or messages can also carry channel-related information including identification of fixed attributes and variable attributes.

A user when on-line can download channel information. For example, a user can register by using a user name and password. Upon authenticating the user's log-on, the user can open (invoke) a channel and retrieve information about the channel from the channel managers. Publishers can use that information in publishing content, and subscribers can use that information for entering and registering subscriptions.

Each channel manager 152, 154, and 156, in this example, acts as a primary for each intelligent router. In particular, each intelligent router is provided two Internet Protocol (IP) addresses in this example, one for a primary channel manager and another for a back-up channel manager. The intelligent routers use those IP addresses to contact a channel manager and retrieve channel information. If the primary fails, an intelligent router can contact a back-up channel manager. The channel managers 152, 154, and 156 thus share data, as indicated by the lines connecting them, concerning channel properties and other information. Each channel manager also has a designated back-up so that if the channel manager fails, another one can take over processing for it. Devices in the network can use commands, for example, to retrieve channel information, examples of which are provided in Table 3. Intelligent routers can alternatively only have a primary channel manager or more than two channel managers.

Figure 7:
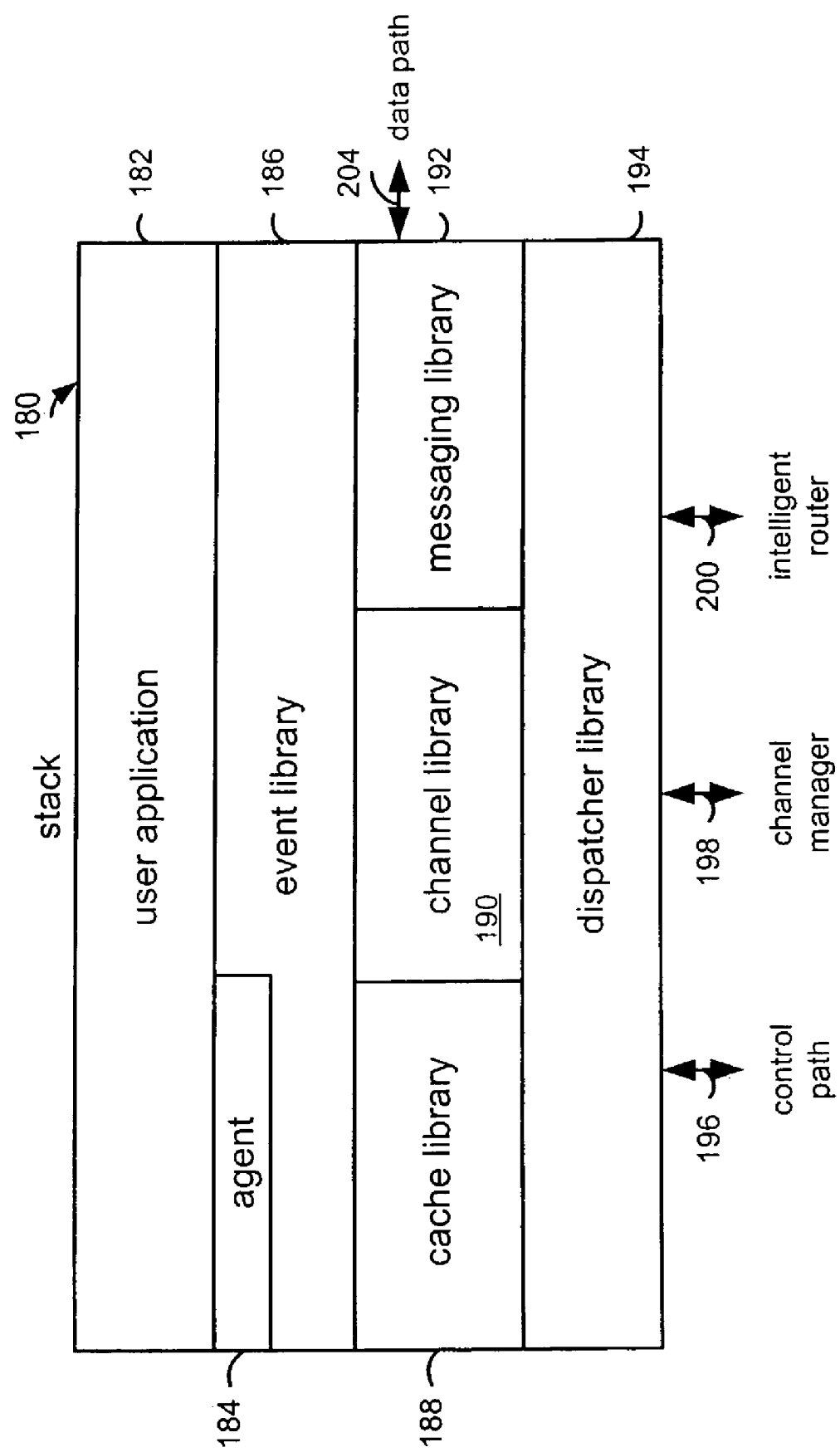
FIG. 7 is a diagram of software components in a user machine for interfacing the machine with intelligent routers

FIG. 7 is a diagram of exemplary software components in a stack 180 in a user machine or device for connecting it with a network having intelligent routers. The user machine can be used as a publisher, subscriber, or both, and it can include the exemplary devices identified above. Stack 180 can include one or more user applications 182, which can provide for receiving subscriptions from a user, receiving channel information from a publisher, or receiving content or data to be published. User application 182 can also include any other type of application for execution by a user machine or device.

The stack 180 can also include, for example, an agent 184, an event library 186, a cache library 188, a channel library 190, a messaging library 192, and a dispatcher library 194. Agent 184 provides for establishing network connections or other functions, and Table 3 provides examples of commands implemented by agent 184, which can use proxy commands or other types of commands. Event library 186 logs events concerning a user machine or other events or information. Cache library 188 provides for local caching of data. Channel library 190 stores identifications of channels and information for them. Dispatcher library 194 provides connections with a control path 196, a channel manager 198, and one or more intelligent routers 200, and it can include the exemplary functions identified in Table 4. Messaging library 192 provides a connection with a data path 204.

Tables 5-9 provide examples of messaging APIs in the C programming language. Tables 5 and 6 provide examples of APIs to send and retrieve messages. Tables 7 and 8 provide examples of APIs to send and retrieve notifications. Table 9 provides examples of APIs to send and retrieve control messages. These APIs and other APIs, programs, and data structures in this description are provided only as examples for implementing particular functions or features, and implementations can include any type of APIs or other software entities in any programming language.

TABLE 3

Examples of Agent Commands

| command | function |
|---|---|
| pc.chn.open | open channel, retrieve all information for channel, and locally cache it |
| pc.chn.close | close channel |
| pc.chn.getRouterInfo | retrieve information for routers on channel |
| pc.chn.getAttributeInfo | retrieve information for attributes of channel |
| pc.chn.getProperties | retrieve properties for channel |

TABLE 4

Dispatcher Functions

| | |
|---|---|
| Server-Side | Listens for connections (sits on accept). Creates a thread to handle each connection. The thread is responsible for receiving and processing all requests coming on that connection. |
| Client-Side | Creates a thread that initiates a connection and is responsible for receiving and processing all data coming into the connection. |

TABLE 5

Example of API to Send a Message

| | |
|---|---|
| PC_Status | PC_msg_init(ChannelHandle ch, PC_UINT chld, PC_UINT userid, PC_TypeInfo* MsgType, PC_UINT msgTypeSize, PC_msg_SessionHandle *sess); |

TABLE 5-continued

Example of API to Send a Message

| | |
|---|---|
| PC_Status | PC_msg_cleanup(PC_msg_SessionHandle sess); |
| PC_Status | PC_msg_closeTransport(PC_msg_SessionHandle sess); |
| PC_Status | PC_msg_create(PC_msg_SessionHandle s, |
| |     PC_msg_DataType dType, |
| |     PC_msg_MsgHandle *msg); |
| PC_Status | PC_msg_delete(PC_msg_MsgHandle msg); |
| PC_Status | PC_msg_clone(PC_msg_MsgHandle org, PC_msg_MsgHandle *new); |
| PC_Status | PC_msg_setSubject(PC_msg_MsgHandle msg, PC_CHAR *subject); |
| PC_Status | PC_msg_setSubjectint(PC_msg_MsgHandle msg, |
| |     PC_USHORT *subjectArray, PC_UINT arraySize); |
| PC_Status | PC_msg_setAttrByNameInt(PC_msg_MSGHandle msg, |
| |     const PC_CHAR *name, PC_INT value); // for each type |
| PC_Status | PC_msg_setAttrByPosInt(PC_msg_MsgHandle msg, |
| |     PC_UINT attributePos, PC_INT Value); // for each type |
| PC_Status | PC_msg_addAttrInt(PC_msg_MsgHandle msg, const PC_CHAR *name, |
| |     PC_INT value); // for each type |
| PC_Status | PC_msg_send(PC_msg_MsgHandle msg); |

TABLE 6

Example of API to Retrieve a Message

| | |
|---|---|
| typedef struct_attribute { | |
|   PC_CHAR | *name; |
| PC_Status | PC_msg_init(ChannelHandle ch, PC_UINT chld, PC_UINT userid, PC_TypeInfo* |
| PC_Status | PC_msg_cleanup(PC_msg_SessionHandle sess); |
| PC_Status | PC_msg_recv(PC_msg_SessionHandle sh, PC_msg_MsgHandle *msg); |
| PC_Status | PC_msg_ctrlRecv(PC_msg_SessionHandle sh, PC_msg_MsgHandle *msg); |
| PC_Status | PC_msg_getSequenceNum(PC_msg_MsgHandle msg, PC_UINT *seqNo); |
| PC_Status | PC_msg_getPublisherInfo(PC_msg_MsgHandle msg, PC_msg_PublicInfo *pub); |
| PC_Status | PC_msg_getSubject(PC_msg_MsgHandle msg, PC_CHAR **subject); |
| PC_Status | PC_msg_getSubjectInt(PC_msg_MsgHandle msg, PC_USHORT **subjectArray, PC_INT *size); |
| PC_Status | PC_msg_getDataType(PC_msg_MsgHandle hMsg, PC_msg_DataType *dataType); |
| PC_Status | PC_msg_getAttrByPosInt(PC_msg_MsgHandle msg, PC_UINT pos, PC_INT *val); // for each type |
| PC_Status | PC_msg_getAttrValueByNameInt(PC_msg_MsgHandle msg, const PC_CHAR *name, PC_INT *val); |
| PC_Status | PC_msg_getAttrValueByNameInt(PC_msg_MSGHandle msg, PC_CHAR *name, PC_INT *val); |
| PC_Status | PC_msg_getAttrTypes(PC_msg_MsgHandle msg, PC_TypeCode* Types, PC_INT *arraySize); |
| PC_Status | PC_msg_getAttributeByPos(PC_msg_MsgHandle msg, PC_UINT attributePos, PC_msg_Attribute **attr); |
| PC_Status | PC_msg_getAttributeByName(PC_msg_MsgHandle msg, const PC_CHAR *name PC_msg_Attribute **attr); |
| PC_Status | PC_msg_getPredefinedAttributes(PC_msg_MsgHandle msg, PC_msg_AttributeArray **attrs); |
| PC_Status | PC_msg_getDiscretionaryAttributes(PC_msg_MsgHandle msg, PC_msg_AttributeArray **attrs); |
| Void | PC_msg_freeAttribute(PC_msgAttribute *attr); |
| Void | PC_msg_freeAttributeArray(PC_msg_AttributeArray*attrArray); |

TABLE 7

Example of API to Send a Notification

ChannelHandle ch;
PC_msg_MsgHandle msg;
PC_msg_SessionHandle sh;
PC_msg_TypeInfo    Types[2];
Types [0].type = PC_STRING_TYPE;
Types [0].name = "company";
Types [1].type = PC_INT_TYPE;

TABLE 7-continued

Example of API to Send a Notification

Types [1].name = "stockvalue"
PC_msg_init(ch, chld, userId, Types, 2, &sh)
PC_msg_create(sh, PC_MSG_DATA, &msg);
PC_msg_setAttrValueByNameInt(msg, "stockvalue", 100);
PC_msg_setAttrValueByPosString(msg, 1, "PreCache");
PC_msg_addAttrString(msg, "comment", "mycomments");
PC_msg_send(msg);

TABLE 7-continued

Example of API to Send a Notification

PC_msg_delete(msg);
PC_msg_closeTransport(sh);
PC_msg_cleanup(sh);

TABLE 8

Example of API to Retrieve a Notification

ChannelHandle ch;
PC_msg_MsgHandle msg:
PC_msg_SessionHandle sh;
PC_msg_TypeInfo    Types[2];
PC_msg_AttributeArray *attrArray;
PC_CHAR *company;
PC_INT value;
Types [0].type = PC_STRING_TYPE;
Types [0].name = "company"
Types [1].type = PC_INT_TYPE;
Types [1].name = "stockvalue"
PC_msg_init(ch, chld, userId, Types, 2, &sh);
While (1) {
    PC_msg_recv(sh, &msg);
    PC_msg_getAttrValueByPosString(msg, 0, &company);
    PC_msg_getAttrValueByNameInt(msg, "stockvalue", &value);
    PC_msg_getDynamicAttributes(msg, &attrArray);
    PC_msg_freeAttributeArray(attrArray);
    PC_msg_delete(msg);
}
PC_msg_closeTransport(sh);
    PC_msg_cleanup(sh);

TABLE 9

Example of APIs to Send and Retrieve Control Messages

| Sender Side Code | Receiver Side Code |
|---|---|
| ChannelHandle ch; | ChannelHandle ch; |
| PC_msg_MsgHandle mh; | PC_msg_MsgHandle msg; |
| Int chld = 10; | PC_msg_init(ch, chld, subId, NULL, 0, &sh); |
| // Get a Channel handle for channel 10 | |
| PC_msg_init(ch, chld, pubId, NULL, 0, &sh) | for (;;) { |
| PC_msg_create(th, | PC_msg_recv(sh, &msg; |
| PC_MSG_CONTROL, | PC_msg_getSubject(msg, &subject); |
| &mh); | PC_msg_getAttrValueByNameInt( |
| PC_msg_setSubject(mh, | msg, "ChannelId, &chld); |
| "#.ADD_SUBJECT"); | PC_msg_getAttrValueByNameString( |
| PC_msg_addAttrInt(mh,,"ChannelId", | msg, "Subject", &subject); |
| chld); | PC_msg_delete(msg); |
| PC_msg_addAttrString(mh, | } |
| "Subject", "Quote.cboe"); | PC_msg_closeTransport(sh); |
| PC_msg_send(mh); | PC_msg_cleanup(sh); |
| PC_msg_delete(mh); | |

Figure 8:
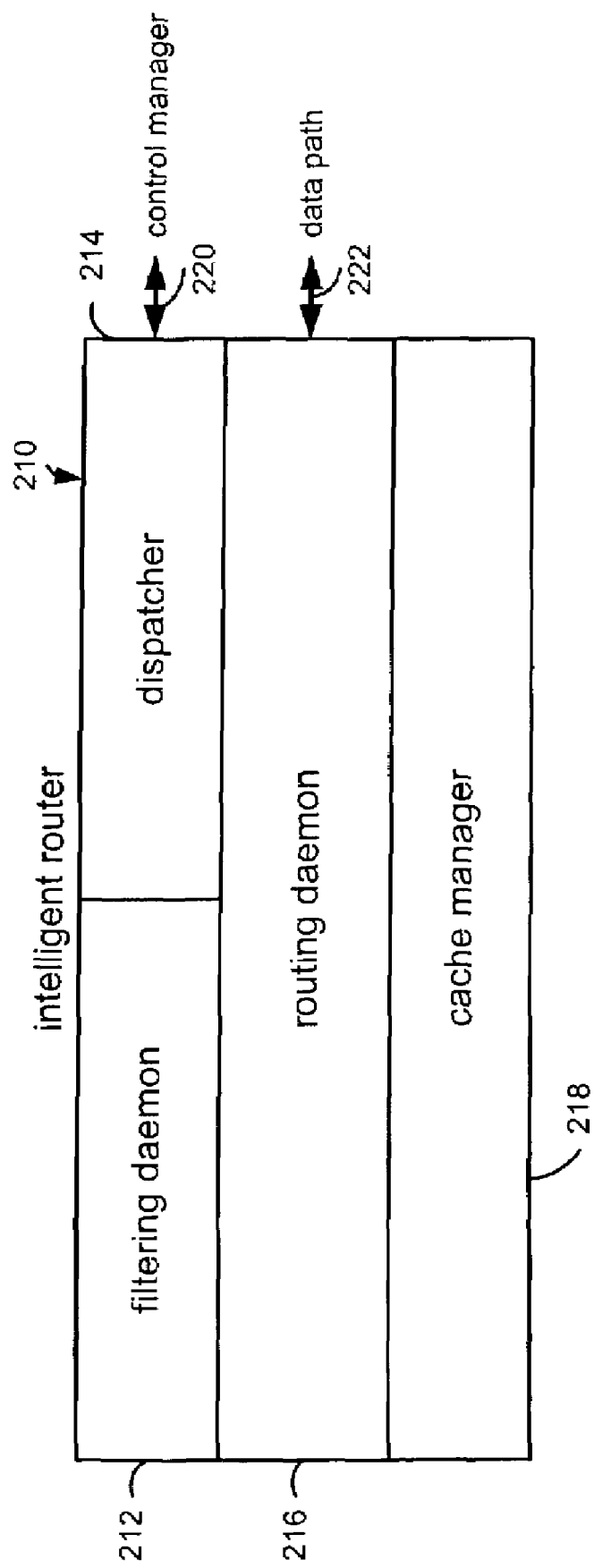
FIG. 8 is a diagram of software components for an intelligent router.

FIG. 8 is a diagram of exemplary software components 210 for an intelligent router such as those identified above and intelligent router 92 shown in FIG. 4. Software components 210 can be stored in, for example, memory 94 for execution by processor 93 in intelligent router 92. Components 210 include, for example, a filtering daemon 212, a dispatcher 214, a routing daemon 216, and a cache manager 218. Filtering daemon 212 provides filtering for content-based routing to process content for subscriptions according to routing rules, as explained below. Dispatcher 214 provides for communication of control messages such as those required for propagating filters via path 220, and the dispatcher can also provide for a single point of entry for users and one secure socket with channel managers, enhancing security of the network. In other words, users do not directly contact channel managers in this example, although they may in alternative implementations. Dispatcher 214 uses control messages to obtain attributes (name-value pairs) from a channel manager.

Routing daemon 216 provides for communication with a data path 222, which can occur via a conventional backbone router as illustrated in FIG. 4 or other routing device. Cache manager 218 provides for local caching of data at the network node including the corresponding intelligent router. The operation of cache manager 218 is further explained below, and it provides for distributed caching of data throughout the network core.

Content-based routing can be implemented at the kernel level, as an alternative to the application level. Memory accessible by the kernel is separate from that in the application layer. To have content-based routing running in the application requires, for example, that message data be copied from the kernel memory area to the application area, and switching the context of the application from that of the kernel to that of the routing application. Both can induce substantial overhead. If instead the kernel is modified to support content-based routing, the routing could take place much faster being rid of the overhead described above.

With this feature of content-based routing in the kernel, the routing daemon 216 may or may not directly send or receive data via the data path 222, depending on the implementation. The daemon is a process running in the application layer, pre-computing the content-based routing table to be injected into the kernel. Once injected, however, the routing table can be used by the kernel to make routing decisions. Similarly, the filtering daemon pre-computes the filtering table and injects it into the kernel. In this kernel implementation, neither the routing daemon nor the filtering daemon would directly interact with the data path.

Figure 9:
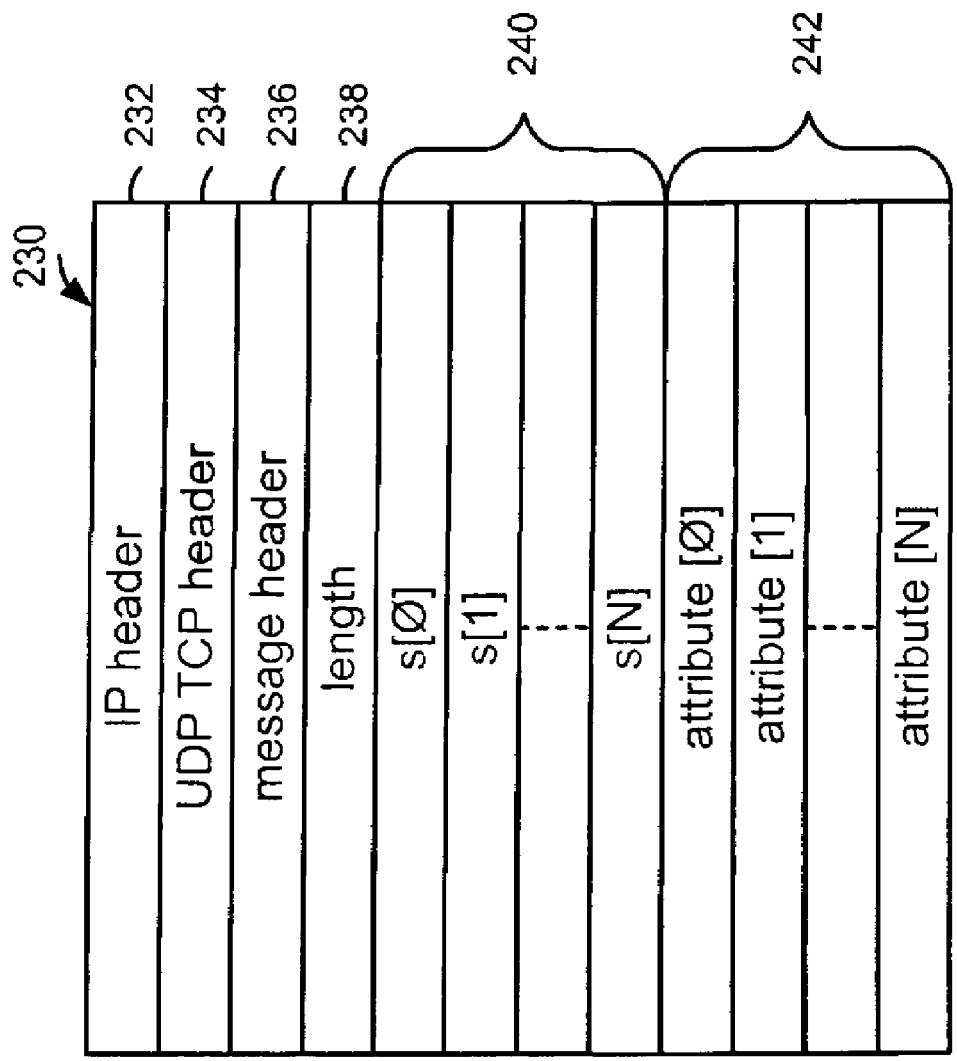
FIG. 9 is a diagram of a packet structure for a message.

FIG. 9 is a diagram of an example of a packet structure 230 for a message possibly including content for subscriptions. A packet or message for use in content-based routing includes, for example, a header section and a payload section. The header section specifies routing or other information. The payload section specifies data or content, or an indication of the data or content. Packet structure 230 includes an IP header 232, a User Datagram Protocol (UDP) Transmission Control Protocol (TCP) header 234, a length value 238, one or more subject fields 240, and one or more attributes 242. Packet structure 230 illustrates a basic structure for a length value and the subjects and attributes. A packet used in content-based routing can also include other or different elements, such as those illustrated in the example of FIG. 18 explained below, and packets for content-based routing can be configured in any manner. Also, the attributes can include discretionary attributes appended to the end of a message, for example. These discretionary attributes are ad-hoc information, for example, added by the publisher (or even routers) that cannot necessarily be conveyed using the message format prescribed for the channel.

Publisher and Subscriber Methodologies

Figure 10:
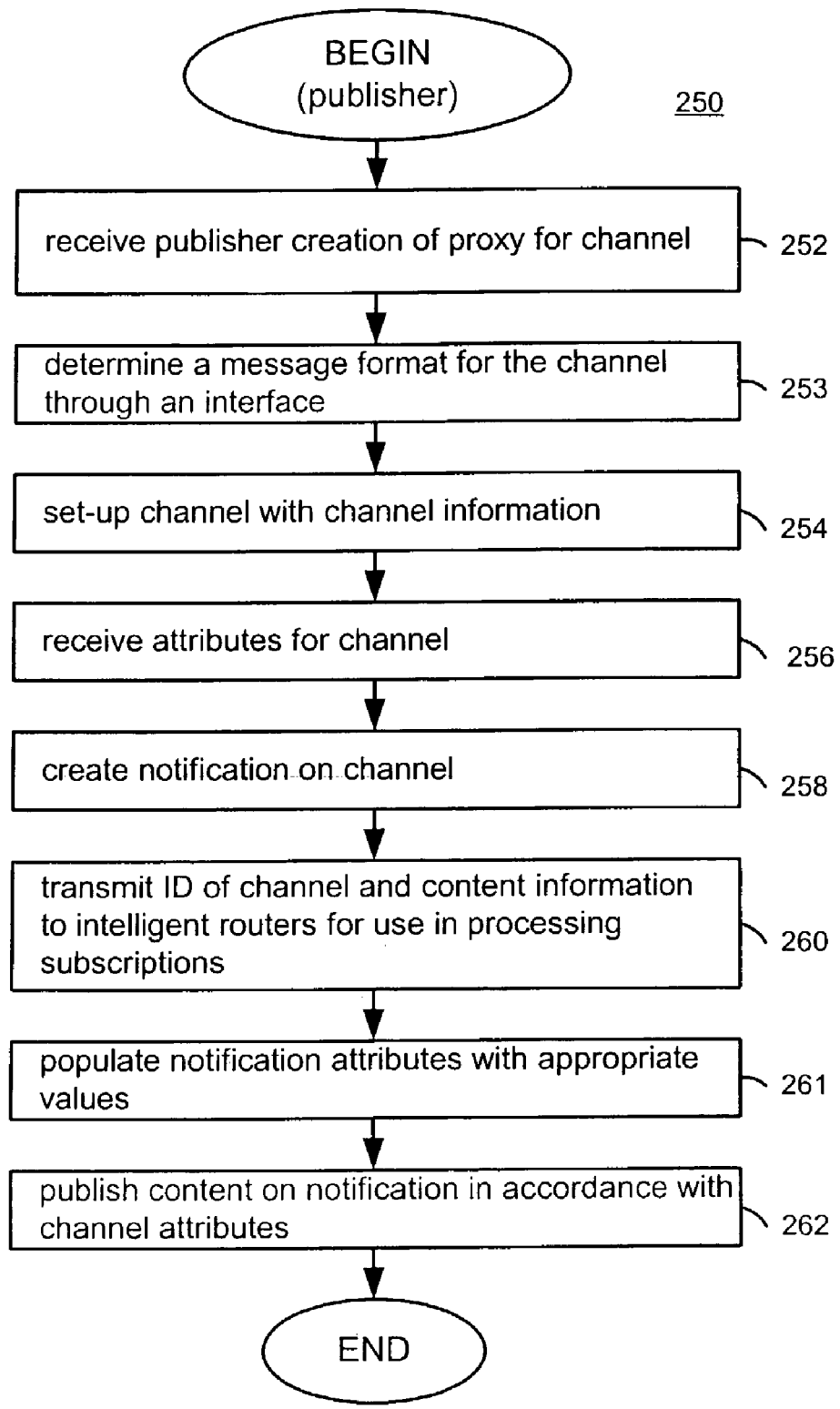
FIG. 10 is a flow chart of a publisher method.

FIG. 10 is a flow chart of an exemplary publisher method 250 for use by a publisher to set-up a channel and publish content. Method 250 can be implemented, for example, in software modules including agent 106 for execution by processor 114 in publisher machine 100. In method 150, agent 106 in the publisher machine receives a publisher creation of a proxy for a channel (step 252). The proxy provides for communication with the network. Agent 106 determines a message format for the channel through an interface (step 253), and the format information can be obtained from, for example, the channel managers or other entities in the network. Agent 106 sets up the proxy for the channel using the received channel information (step 254), which includes receiving attributes for the channel (step 256) and creating a notification on the channel (step 258). The notification provides content for devices "listening" for content on the channel. The attributes define parameters and characteristics for the notification.

Agent 106 transmits an identifier (ID) of the channel and content information to intelligent routers in the network core or elsewhere for use in processing subscriptions (step 260). The publisher populates the notification attributes with appropriate values (step 261), and the publisher can then publish content on notification in accordance with the channel attributes (step 262). Steps 260-262 in this example accomplish publishing the notification, which can alternatively involve different or additional steps depending upon a particular implementation. Therefore, the information associated with a notification in this example is partitioned into an ordered sequence of attributes, each of which has a name, a position within the notification (starting at 1), a type, and a value. Alternatively, attributes can have different characteristics depending upon a particular implementation. Attributes can include, for example, predefined attributes, discretionary attributes, or both.

The intelligent routers can use the channel ID in a packet to obtain the attributes for the corresponding channel, which determines the structure or format for packets transmitted via the channel. In particular, each packet can contain, for example, a tag associated with a channel ID and other header information such as a publisher ID and subjects. The tags can be used to map subjects to numbers in the message format, an example of which is shown in FIG. 18. Small integer values, for example sixteen bit values, can be used for the numbers. Alternatively, any other type of numbers or information can be used to map the subjects. Mapping subjects to numbers can provide particular advantages; for example, it can save space in the message format and provide a uniform or standard way to specify indications of the subjects in the message so that they can be quickly located and identified. Intelligent routers can locally store the mapping or, alternatively, use the numbers to remotely obtain the corresponding subject through a command.

Table 10 illustrates a structure for mapping numbers to subjects, in this example using integer values. The subject tree parameter in the table indicates that a subject can include one or more subject fields in an hierarchical relationship; for example, a subject tree can include a string of subject fields demarcated by particular symbols. Examples of subject trees are provided in Table 2. As an example, a subject tree quotes.nyse includes a subject "quotes" and a sub-field "nyse" with those two terms demarcates by a "." as found in URLs or other network addresses. Aside from using periods and specifying URL-type strings, subject trees can be specified in any way using any characters and symbols for demarcation.

TABLE 10

| Number | Subject Tree |
| --- | --- |
| integer value 1 | subject tree 1 |
| integer value 2 | subject tree 2 |
| ... | |
| integer value N | subject tree N |

Thus, knowing the packet format or structure for a particular channel, the intelligent routers can quickly locate subjects and attributes, or other information, in the packet for content-based routing. For example, a channel can specify byte positions of subjects and attributes transmitted over the channel, making them easy to locate by counting bytes in the packet. Alternatively, intelligent routers can parse packets to locate subjects and attributes, or other information.

Table 11 provides an example of a publisher program in the C++ programming language. Table 12 provides an example of an API to create a channel. Table 13 provides an example of a channel configuration file maintained by a channel manager (see FIG. 6) and providing channel-related information, as illustrated. The system can alternatively have a global channel manager providing IP addresses of geographically dispersed servers functioning as local channel managers in order to distribute the processing load.

TABLE 11

Example of Publisher Program

```
#include "PC_evn_Notification.h"
#include "PC_evn_Proxy.h"
using namespace precache::event;
int main(int argc, char argv[ ])
{
    PC_UINT QuotesRUs = myChannelofInterest; // channel ID
    PC_UINT myID = myPublisherID; // publisher ID
```

TABLE 11-continued

Example of Publisher Program

```
    try {
        Proxy p(QuotesRUs, myID);
        Notification n1 (p, "quotes.nyse");
        n1.SetPredefinedAttr("symbol", "LUS");
        n1.SetPredefinedAttr(price", 95.73);
        p.Publish(n1);
        Notification n2(p, "quotes.nyse");
        n2.SetPredefinedAttr(1, "SNE");      // attribute symbol is in position 1
        n2.SetPredefinedAttr(2, 80.18);      // attribute price is in position 2
        p.Publish(n2);
    }
    catch (InvalidChannelException icex) {
        cerr << "bad channel" << endl;
    }
    catch InvalidSubjectException isex) {
    }
    catch (InvalidNotificationException inex) {
        cerr << "bad notification" << endl;
    }
    catch (Exception ex) {
        cerr << "unknown error" << endl;
    }
}
```

TABLE 12

Example of API to Create a Channel

```
PC__Status rc;
rc = PC__chn__create(Provider__info, authinfo,
ConfigurationFile, &hChannel);
/* the first one primary channel manager */
rc = PC__chn__addChannelManager (hChannel, "10.0.1.1");
/* secondary channel manager */
rc = PC__chn__addChannelManager (hChannel, "10.0.2.2");
*/
rc = PC__chn__setProperties (hChannel, ConfigurationFile);
/*
Set the message type (only in fixed part of the message)
by using re = PC__chn__setAttributeType(hChannel,
name, position, attributeType).
The type information is propagated to all edge routers.
*/
rc = PC__chn__setAttributeType(hChannel,"Priority",
1,PC__UINT16__TYPE);
rc = PC__chn__setAttributeType(hChannel,"Alarm__Name",
2, PC__STRING__TYPE);
rc = PC__chn__setAttributeType(hChannel,"Alarm__Time",
3, PC__INT32__TYPE);
rc = PC__chn__updateAttribute(hChannel);
rc = PC__chn__close(hChannel); /* finish channel creation */
```

TABLE 13

Example of a Channel Configuration File

```
# Channel Setup - Read by Channel API, event and messaging
# Each channel entry information is tagged with the
# type of information e.g.
# [ChannelComm 5] for Channel 5 Communication related information
# [ChannelSubjects 5] for subject related information in channel 5
# [ChannelAttributes 5] for attribute information in channel 5

# The Channel id is appended to the tag to indicate
# the channel that the information belongs to
# e.g. [ChannelComm 5] indicates routing information
# for channel 5.

# All the fields need not be set. For example if
# running with the central server, the MulticastIP is
# not needed.
```

TABLE 13-continued

Example of a Channel Configuration File

```
[ChannelComm 5]
MulticastIP=225.0.0.1
RouterIP=test3
RouterPort=12345
ProxyPort=9015
ProxyCtrlPort=9016
[ChannelSubjects 5]
NumberOfSubjects=2
subject1=#.SUBSCRIPTION
mapping1=0.100
subject2=Quotes.Nyse
mapping2=102.101
[ChannelAttributes 5]
NumberOfAttributes=4
name1=StockId
type1=PC__UINT__TYPE
name2=Company
type2=PC__CHARARRAY__TYPE
name3=Price
type3=PC__FLOAT__TYPE
name4=Volume
type4=PC__UINT__TYPE
```

Figure 11:
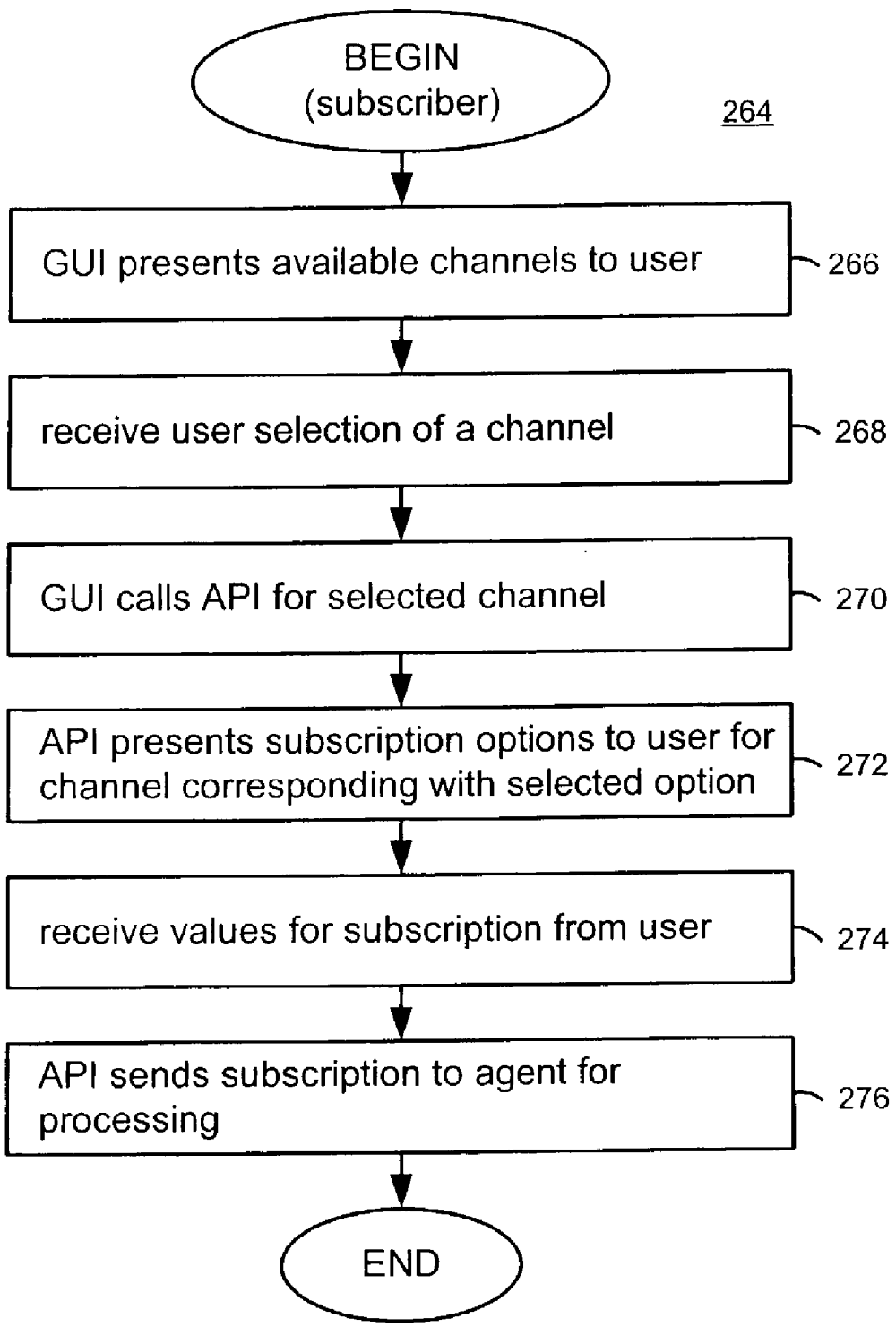
FIG. 11 is a flow chart of a subscriber method.

FIG. 11 is a flow chart of a subscriber method 264 for use in receiving and processing subscriptions. Method 266 can be implemented, for example, in software //////modules including agent 128 for execution by processor 134 in subscriber machine 122. In method 264, a graphical user interface (GUI), for example, presents an indication of available channels to a user (step 266), which can be accomplished by application 126. The information identifying the channels can be received from, for example, the channel managers providing channel-related information. Any type of application 126 can be used for presenting identifications of channels in any particular way or format. The application receives a user's selection of a channel (step 268) and calls an API or other program for the selected channel (step 270). The API presents subscription options to the user for the channel corresponding with the selected option (step 272). The API receives values for the subscription from the user (step 274) and sends the subscription to agent 128 for processing, as explained below (step 276).

The parameters for the subscription can include, for example, the predicates as illustrated in Table 1. Each channel can use its own API, for example, in order to process subscriptions according to the particular requirements or parameters for the corresponding channel. These APIs can include, for example, web-based or Java-based APIs for receiving subscriptions and can use any type of user interface and processing to receive information for a subscription and pass it along to the agent application.

Figure 12:
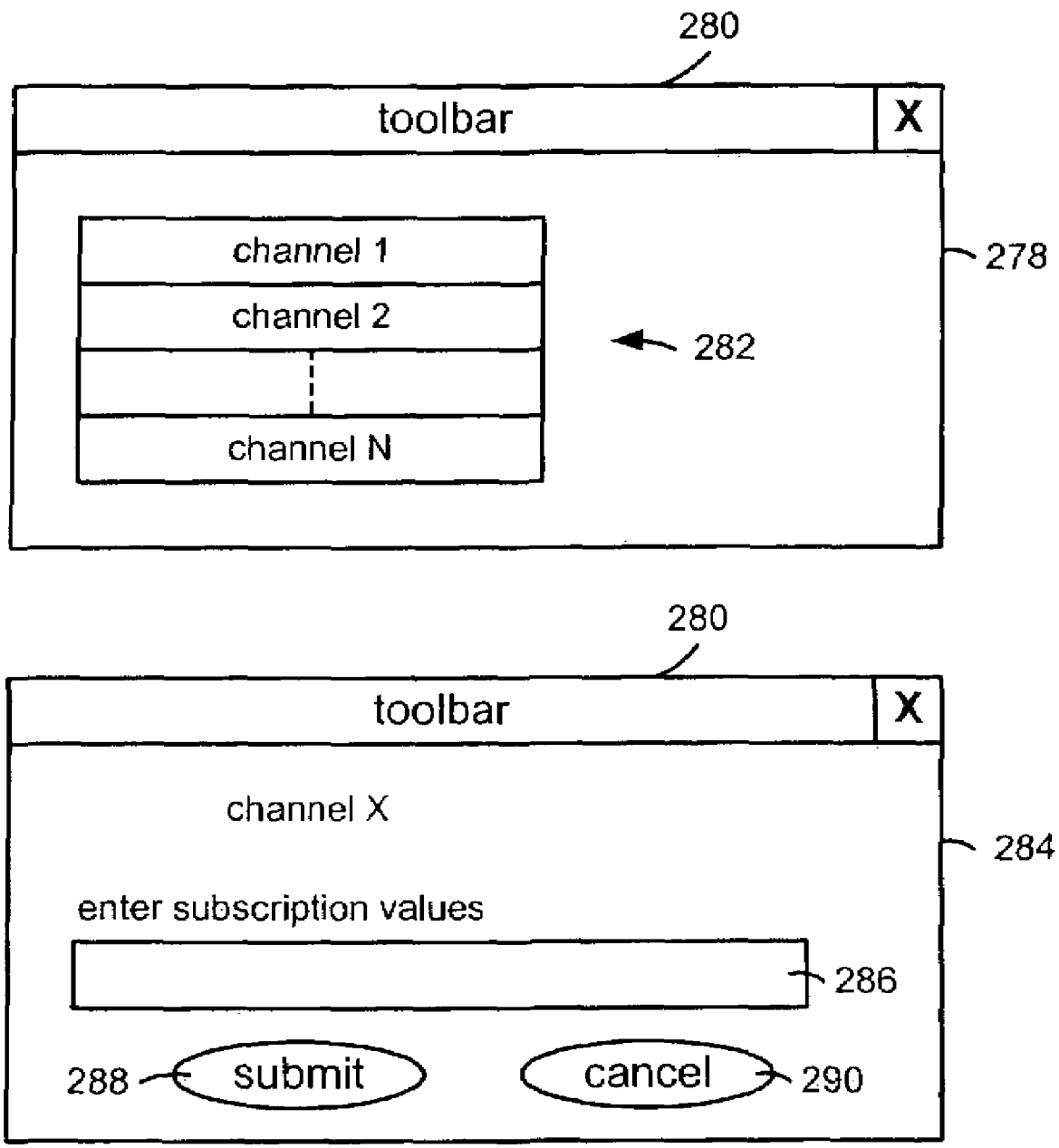
FIG. 12 is a diagram of channel and subscriber screens.

FIG. 12 is a diagram conceptually illustrating channel and subscriber screens or GUIs 278 and 284, which can be used in conjunction with method 264 for receiving a subscription. Screen 278 includes a plurality of sections 282 identifying available channels for selection by a user. Upon selection of a particular channel, screen 284 can be displayed for receiving a user's values for the subscription in a section 286. A user can select a section 288 to submit the subscription or select a section 290 to cancel the subscription. Screens 278 and 284 can be formatted as, for example, HyperText Markup Language (HTML) web pages or in any other format. Also, the screens can include any configuration of sections and content, possibly including, for example, text, graphics, pictures, various colors, or multi-media information in order to provide, as desired, a user-friendly and visually appealing interface for subscribers. The screens can also include a toolbar 280 providing, for example, conventional browser functions.

Table 14 provides an example of a subscriber program in the C++ programming language.

TABLE 14

Example of Subscriber Program

```
#include <unostd.h>
#include <iostream>
#include "PC_evn_Filter.h"
        #include"PC—evn_Subscription.h"
        #include"PC_evn_Proxy.h"
            using           namespaceprecache::event
            class           SubscriberApp        :publicSubscriber
            {
        private":
    PC_UINT notificationCount = 0;
public:
    SubscriberApp( ) { } // default constructor
    void run( )
    }
        PC_UINT QuotesRUs = myChannelofInterest;     //channel ID
        PC_UINT myID = myPublisherID;                // publisher ID
        try {
            Proxy          p(QuotesRUs, myID);
            FilterFactory* factory = FilterFactory::GetFilterFactory( );
            Filter*        f = factory->CreateFilter(p, "symbol == \"LU\"");
            PC_INT         c1 = 0;
            SubscriptionHandle sh = p.Subscribe("quotes.nyse", f, this,
                                                (void*)&c1);
            while (notificationCount > 2) {          // let notify( ) get some
                                                     // notifications
                sleep(5);
            }
            p.Unsubscribe(sh);
        }
        catch (InvalidChannelException icex) {
            cerr << "bad channel" << endl;
        }
        catch (InvalidSubjectException isex) {
            cerr << "bad subject" << endl;
        }
        catch (InvalidChannelException ifex) {
            cerr << "bad filter" << endl;
        }
        catch (InvalidSubscriptionHandleException ishex) {
            cerr << "bas subscription handle" << endl;
        }
        catch (Exception ex) {
            cerr << "unknown error" << endl;
        }
    }
    void Notify(Notification* n, void* c) //this is the callback method
    {
        if(*(PC_INT*)c == 0){ // check the closure object
            PC_STRING symbol;
            PC_FLOAT price;
            n->GetPredefinedAttr("symbol", symbol);
            n->GetPredefinedAttr("price", price);
            cout << "The price of " << symbol << " is " << price << endl;
            notificationCount++;
        }
    }
```

TABLE 14-continued

Example of Subscriber Program

```
};
int main(int argc, char argv[ ])
{
    SubscriberApp a;
    a.run( );
    }
```

Content-Based Routing Via Payload Inspection and Channels

Figure 13:
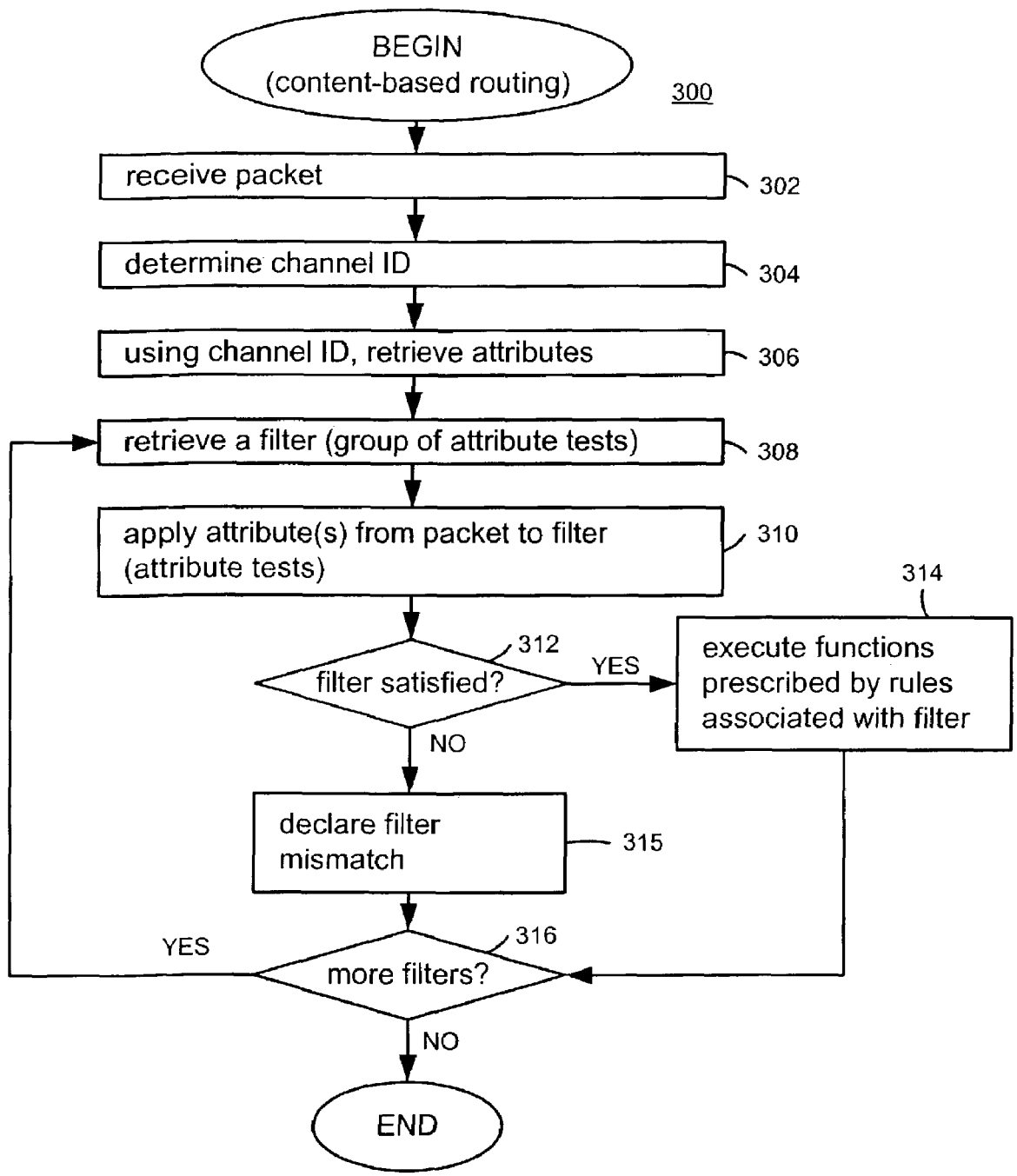
FIG. 13 is a flow chart of a content-based routing method.

FIG. 13 is a flow chart of a content-based routing via payload inspection method 300. Method 300 can be implemented, for example, in software modules for execution by processor 93 in intelligent router 92, as represented by filtering daemon 212. Alternatively, it can be implemented in an ASIC or a combination of hardware and software. The content-based routing as illustrated in method 300 can be performed in intelligent routers anywhere in the network, such as in the network core or in edge routers.

In a general sense, the content-based routing involves inspecting a payload section of a packet in order to determine how to process the packet. This content-based routing methodology can include, for example, processing a list of subscriptions (using filters, for example) in any order, comparing a message subject-by-subject and attribute-by-attribute with routing rules to determine a routing for the message, and performing the processing in a network core. The rules can include rules governing in-router processing or any rules associated with a filter. These routing decisions can thus be distributed throughout a network core. The use of subjects as represented by channels determines a message format, thus providing an intelligent router with a way of quickly locating attributes within the message, for example by knowing their byte positions in the message or packet for a particular channel.

In method 300, intelligent router 92 receives a packet for a message (step 302). It determines from the packet a channel ID for the corresponding message (step 304) and retrieves attributes for the channel using the channel ID (step 306). In this example, the type of channel (determined from the channel ID) determines locations and data types of attributes in the packet. The attributes for the channel can be locally stored or retrieved remotely such as via a channel manager. Intelligent router 92 retrieves a filter, which corresponds with a subscription (step 308). The filter includes one or more attribute tests, usually a group of attribute tests for subscriptions. Intelligent router 92 applies attributes in the packet to the corresponding attribute test(s) in the filter description (step 310).

If all the attribute test(s) in the filter description produce a positive result (step 312), meaning the attributes satisfy all the attribute test(s), the intelligent router executes a set of functions prescribed by the rules associated with the filter (step 314). These functions can include, for example, routing the packet to the next link, and/or performing some action or computation with the content of the packet at the local router as prescribed by the rule(s). The action or next link can be identified, for example, in a data structure specifying the corresponding subscription. When the rule is a link, it typically identifies the next network node to receive the packet, which can include an intelligent router, backbone router, a network-connected device, or other entity. Alternatively, the next links can be specified or associated with the subscriptions in other ways.

If all the attribute test(s) in the filter description did not produce a positive result (step 312), meaning the attributes do not satisfy all the attribute test(s), the filter is declared a mismatch (step 315). The intelligent router recursively follows the above procedure until all the attribute tests in the filter description are exhausted or a first negative result is encountered, whichever comes first.

Once all the attribute tests have been processed for this filter, the intelligent router determines if more filters exist (step 316) and, if so, it returns to step 308 to retrieve the attribute test(s) for the next filter to process the attributes for it. The matching procedure (steps 308, 310, 312, 314, 315, and 316) continues until either the complete set of filters is exhausted, or results for all the action or routing rules can be determined, whichever comes first. If the packet does not satisfy any filter, it will be dropped (discarded) and not forwarded.

Intelligent router 92 can sequence through the filters in any particular order. For example, as illustrated in Table 15, intelligent router can store the filters for subscriptions in a file or routing table and linearly sequence through them to apply the attributes to filters (attribute tests). Alternatively, the routing table can include links or pointers to the filters.

The content-based routing can optionally use more than one method at the same time, depending on the applications and performance-enhancing heuristics such as the switching of algorithms based on traffic conditions, for example. The filters for the processing can optionally be encrypted, decrypted, transformed, and merged at a router in the network for use in performing inspecting of a payload section for the content-based routing. For example, a subscription such as price>$3.54122 may be truncated to price>$3.54 because the publications in the application are known not to contain currency attributes beyond the second decimal points. Also, foreign currency may be translated into U.S. currencies as well when a publication sent from overseas reaches the first router located in the U.S., for example.

As an alternative to a linear approach, intelligent router 92 can select filters for processing in other orders or according to various algorithms that can possibly enhance the speed and efficiency of processing. Table 16 provides examples of subscriptions and corresponding links for them; in these examples, the subjects relate to a particular channel and the subscriptions for the subjects can be represented by routing rules for the filters. The subjects can include, for example, network addresses such as Uniform Resource Locators (URLs) identifying a source of content.

TABLE 15

| Subscriptions | Links |
|---|---|
| Channel 1 | |
| filter 1a | links 1a |
| filter 2a | links 2a |
| ... | ... |
| filter Na | links na |
| Channel N | |
| filter 1N | links 1a |
| filter 2N | links 1b |
| ... | ... |
| filter NN | links 1n |

TABLE 16

Caching at Network

| Content Predicate | Links |
|---|---|
| sub = "quote.optimist" & <br> ( ($1 > 5 & $2 = "LU") <br> \| ($1 > 30 & $2 = "T")) | x10, x115 |
| ( sub = "sony.music" \| sub = "sony.movie") <br> & $1 > 30 & $4 = "Beethoven" | x11, x13 |
| sub = "movie.ratings" & <br> ($1 > 1999 \| $2 = "Kurosawa") & $3 = "*" | x11, s15 |

Nodes

Figure 14:
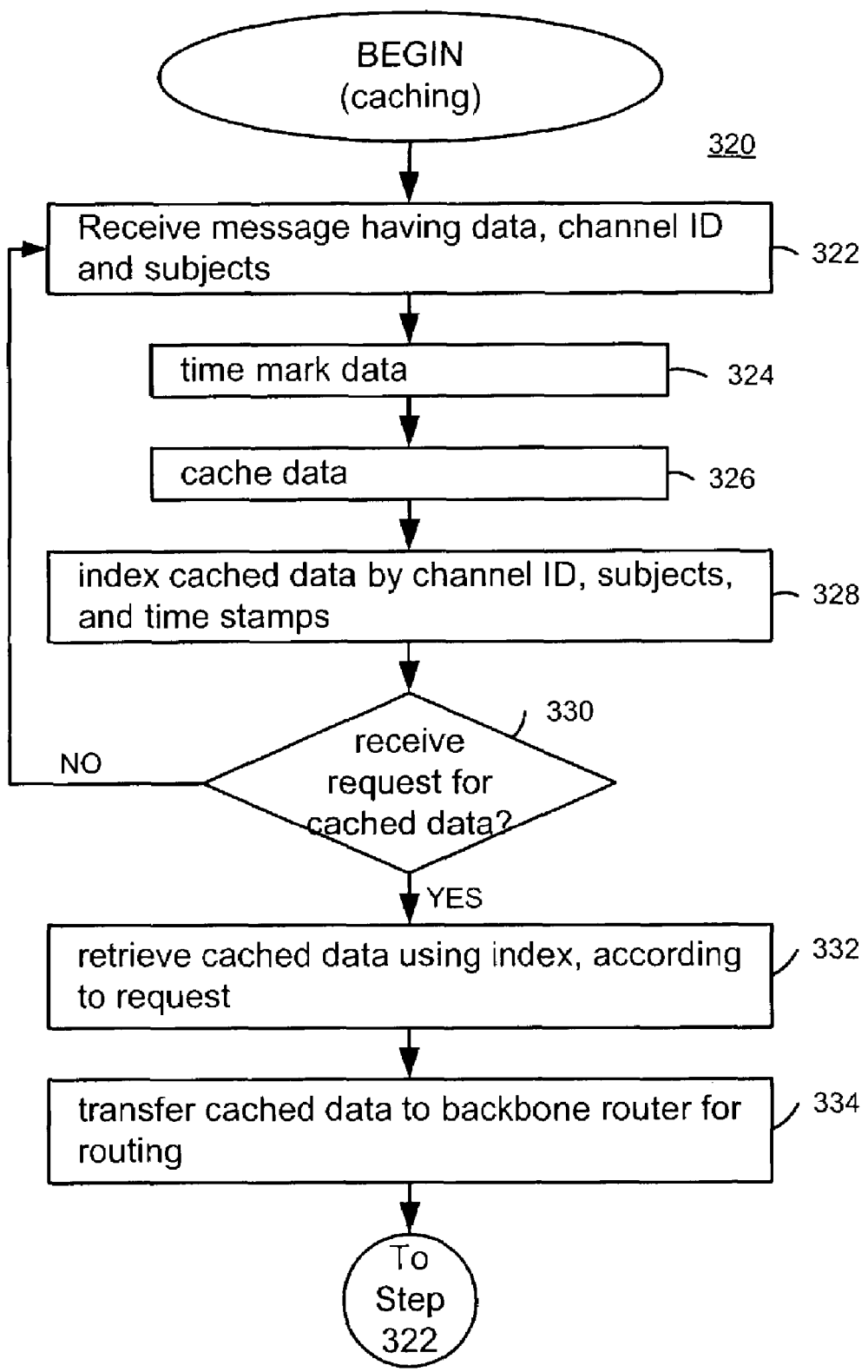
FIG. 14 is a flow chart of a caching method.

FIG. 14 is a flow chart of a caching method 320. Method 320 can be implemented, for example, in software modules for execution by processor 93 in intelligent router 92, as represented by cache manager 218. Alternatively, it can be implemented in an ASIC or a combination of hardware and software, either in the same or different physical device as the corresponding intelligent router. In method 320, intelligent router 92 receives a message having data or content, a channel ID, and subjects (step 322). Intelligent router 92 time marks the data (step 324) and locally caches it such as in memory 94 or secondary storage 97 (step 326). It indexes the cached data by, for example, channel ID, subjects, and time stamps (step 328).

If intelligent router 92 receives a request for data (step 330), it retrieves cached data, using the index, according to the request (step 332). Intelligent router 92 transfers the cached data to backbone router 95 or other routing entity for eventual transmission to the requestor or others. Method 320 can be repeatedly executed in order to continually cache data and retrieve cache data in response to requests.

Figure 15:
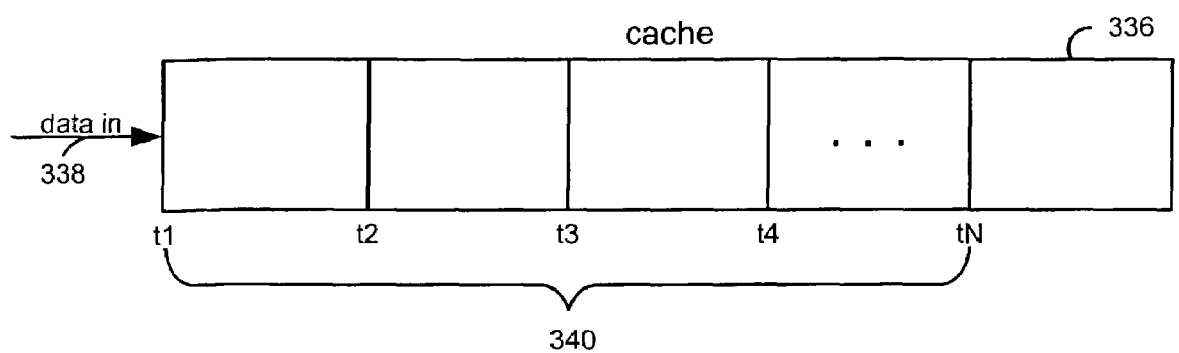
FIG. 15 is a diagram illustrating a cache index.

FIG. 15 is a diagram illustrating a cache index (336) for use with method 320. Cache index (336) receives data (338) and stores it with time stamps (340). As data is gathered, it is marked upon every duration of delta t, where delta t represents the time between marks, for example $t_2 - t_1$. Other types of indexes for time marking in any way can alternatively be used.

Table 17 conceptually illustrates indexing of cached data. Table 18 conceptually illustrates a data structure for storing a connection history for caching. Table 19 provides examples of data structures for use in locally caching data in network nodes having intelligent routers.

The time marking can occur at any fixed or variable interval. For example, data can be cached and indexed every five minutes. Upon receiving a command to retrieve cached data (such as #.getCache) specifying a time and subject, channel manager 218 uses the cache index to determine if it can retrieve cached data corresponding with the request for step 332.

Each subject or channel can include, for example, its own IP address in a multicast tree and a set of intelligent routers. Therefore, Table 18 represents a connection history among such routers that can be locally stored a user machine; if an edge router fails, the machine can access the connection history to determine how to reconnect with upstream routers for the channel when the edge router comes back on-line. It can also execute a get cache command for the duration of the time that it was disconnected in order to obtain any pending content for subscriptions, for example.

TABLE 17

| | | | |
|---|---|---|---|
| $t_1$ | channel ID 1 | subjects 1-n | pointer 1 to cached data |
| $t_2$ | channel ID 2 | subjects 1-n | pointer 2 to cached data |
| $t_n$ | channel ID N | subjects 1-n | pointer N to cached data |

TABLE 18

Connection History

| time | router | network addresses | |
|---|---|---|---|
| $t_1$ | R2 | UR2 | UR3 |
| $t_2$ | R2 | UR2 | UR3 |
| ... | | | |

TABLE 19

Examples of Cache Data Structures for Intelligent Router

Channel Node

```
Struct ChannelNode {
    PC_UINT           unChanId;
    PC_AttributeInfo  *pAttrinfo;
    PC_BOOL           bPersistent; /* Persistent or RT*/
    PC_UINT           unTimeout;
    PC_UINT           unTimeGranularity;/* in minutes */
    PC_INT            nDirFd;
    HashTable         *pFirstLevelSubjs;
}
```

Subject Node

```
Struct SubjectNode {
    PC_USHORT   unSubjectId;
    PC_UINT     unSubjLevel;
    Void        pParent;  /* Channel or Subject */
    PC_INT      nDirFd;
    HashTable   *pNextLevelSubjs;
    DataNode    *pData;
}
```

Data Node

```
Struct DataNode {
    PC_INT             nDirFd;
    SubjectNode        *pParent;
    LastTimeGrainNode  *pLastTGrainData;
    DLIST              *pStoredData;/*list
                       StoredTimeGrainNode */
    PC_Mutex           mStoredDataLock;
}
```

Stored Time Grain Node

```
Struct StoredTimeGrainNode {
    PC_UINT   unStartTime; /* in minutes */ChanId;
    PC_UINT   unEndTime; /* in minutes */
    PC_INT    nFd;
}
```

TABLE 19-continued

Examples of Cache Data Structures for Intelligent Router

Last Time Grain Node

```
Struct LastTimeGrainNode {
    PC_CHAR     pLastTGrainData;   /* could be a list */
    PC_UINT     unLastTGrainStartTime;
    PC_BOOL     bReadyToStore;
    PC_Mutex    mCachedDataLock;
}
```

These exemplary data structures include the following information. A subject node contains a subject identifier, subject level, pointer to parent channel or subject node, file descriptor for its own directory, pointer to hash table containing its next level subject nodes, and pointer to a data node. A data node contains a pointer to its subject parent node, file descriptor for the data directory, circular buffer containing the data structures for the data stored on each storage device, head and tail of the buffer, and lock for locking the data node during retrieval and storage. The stored time grain node is the node representing the actual data file, and the last time grain node represents the last buffer that has not yet been stored to the storage device but is maintained in memory. The caching and data storage threads in this example use the mutex of the last time grain node for preventing concurrent access to the last time grain node.

Agent Processing

Figure 16:
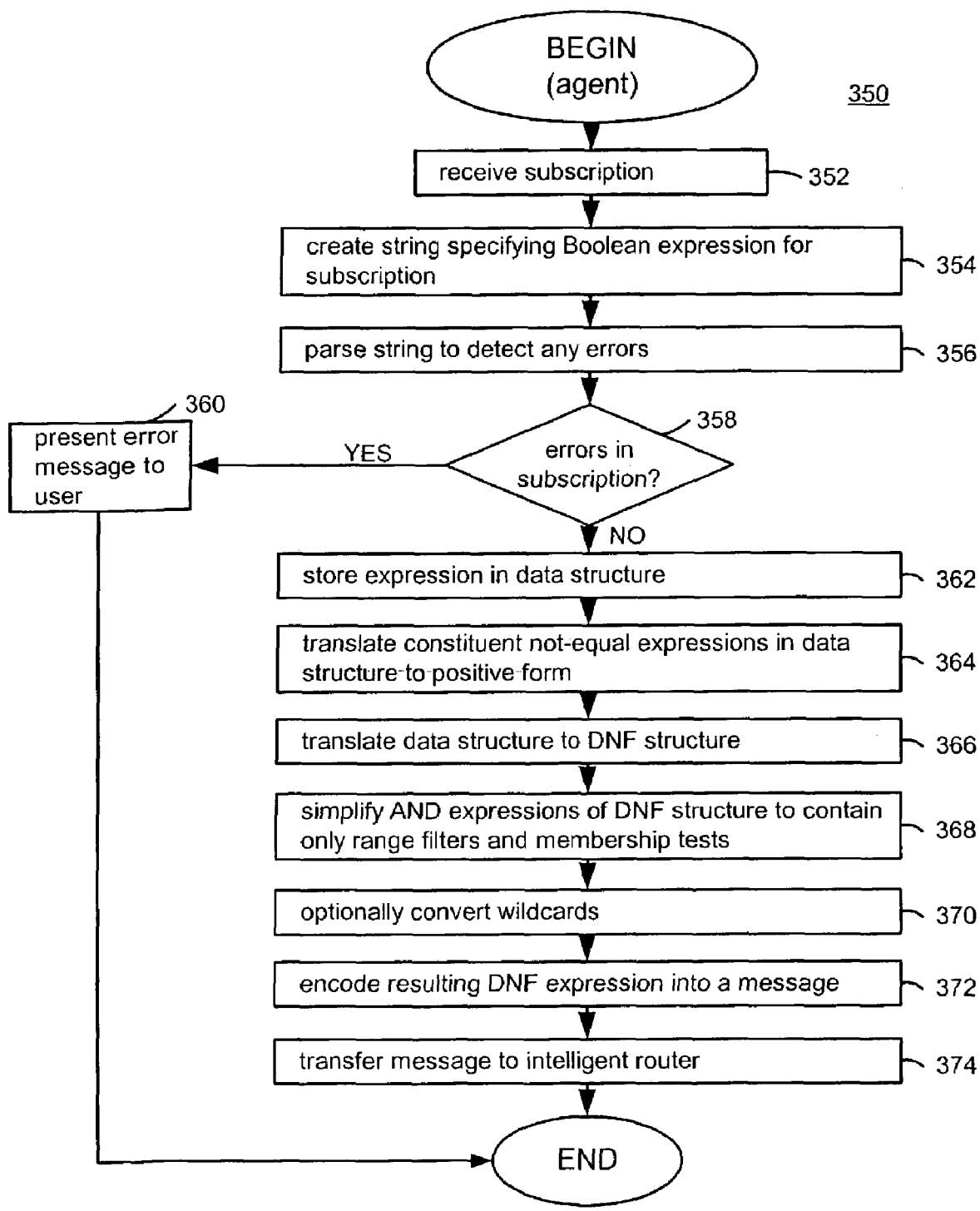
FIG. 16 is a flow chart of an agent method for an outgoing message.

FIG. 16 is a flow chart of an agent method 350 for an outgoing subscription message. Method 350 can be implemented, for example, in software modules as represented by agent 128 for execution by processor 134 in user (subscriber) machine 122. In method 350, agent 128 receives a subscription such as via the method described above in FIGS. 11 and 12 (step 352). Agent 128 creates a string specifying a Boolean expression for the subscription (step 354) and parses the string to detect any errors in the subscription (step 356). If an error exists, agent 128 can present an error message to the user (step 360) in order for the user to correct the error and re-enter the subscription. If the subscription contains no errors (step 358), agent 128 stores the expression in a data structure, an example of which is provided below (step 362). Agent 128 translates constituent not-equal expressions in the data structure to positive form (step 364) and translates the data structure to a corresponding disjunctive normal form (DNF) structure (step 366). Agent 128 also simplifies AND expressions of the DNF structure to contain only range filters and membership tests (step 368).

The DNF is a well-known canonical form in which a Boolean expression is represented as an OR of one or more sub-expressions called disjuncts, each sub-expression being an AND of one or more attribute tests. For example, the Boolean expression (price>=10 AND (symbol=="LU" OR symbol=="T")) has an equivalent DNF representation of ((price>=10 AND symbol=="LU") OR (price>=10 AND symbol=="T")).

The transformation in step 364 involves translating expressions having the "not-equal" operator (represented in an exemplary syntax as !=) into an equivalent "positive" form that specifies all allowed values rather than the one disallowed value. This transformation is performed prior to creation of the DNF, and it is needed because the routers in this example require formulae to be in positive form. For example, the expression (price !=80) can be transformed to the equivalent positive expression (price<=79 OR price>=81).

The transformation in step 368 is performed after the DNF is created and involves an extra simplification of the resulting AND expressions, and it is also performed to simplify the work of the routers in this example. In particular, an AND of multiple attribute tests for the same attribute can be simplified into a canonical "range filter" having either one lower bound, one upper bound, both a lower and upper bound, or a single value in the case of an equality test. The particular kind of range filter is then encoded according to Table 22.

For example, the expression (price>=10 AND price<=80 AND price>=20 AND price<=100) can be simplified to the expression (price>=20 AND price<=80), which is an example of a range filter with both a lower and an upper bound. Examples of the other kinds after simplification are the following: (price>=20) (lower bound only); (price<=80) (upper bound only); and (price==50) (single value). In creating these range filters, it is possible that some sub-expression will simplify to true or to false, in which case the sub-expression can be eliminated according to the laws of Boolean algebra, thereby further optimizing the encoding of the expression in a message. For example, the expression (price>=50 AND price<=20) simplifies to false, since no value for "price" can satisfy the expression. In the special case in which a whole filter expression simplifies to false, the agent need not create a message at all, thereby relieving the router of unnecessary work.

If the subject filter contains wildcards, agent 128 can optionally convert them as explained below (step 370). Otherwise, any wildcards can be converted in the network, rather than on the user machine or other device. In this exemplary embodiment, the syntax for subject filters is the only syntax that uses wildcards, and the syntax for attribute filters is the only syntax that uses Boolean expressions. Alternatively, implementations can use different or varying types of syntax for subject filters and attribute filters.

Agent 128 encodes the resulting DNF expression into a message (step 372) and transfers the message to an intelligent router (step 374). The encoding can involve converting the subscription to a flat message format, meaning that it constitutes a string of data. This transferring can involve propagating routing rules generated from subject filters and attribute filters for the subscription to one or more intelligent routers or other routing entities in the network. For the propagation, the subscription expression can be mapped into a conventional packet structure, for example.

The encoding for step 372 involves marshalling subscriptions for a channel into a messaging format of the messaging API for propagation throughout a channel. A subscription is internally messaged, for example, as a notification with subject #.SUBSCRIPTION. Because there are both a variable number of subject filter fields and a variable number of attribute tests, one pair of bytes is used to store the number of subject filter fields, and another pair of bytes is used to store the number of attribute tests in this example. The individual fields of the subject filter are marshaled sequentially, for example, in the order in which they were specified in the original subscription and are each marshaled into a two-byte portion of the message. Wildcard fields can be marshaled as described below.

In marshaling the attribute tests, the operands of the tests are marshaled at the end of the message in a manner similar to the marshaling of attribute values of notifications. Prior to marshaling the attribute tests and operands, they are sorted by attribute order within each disjunct of the DNF with tests on predefined attributes in position order, followed by tests on discretionary attributes in name order. Furthermore, the set of relational tests on scalar valued attributes within each disjunct are simplified to a canonical form as range filters having either one limit (for left- or right-open ranges or equality tests) or two limits (for closed ranges between distinct limits). The remaining information about the tests is encoded into, for example, two-byte pairs in the same order as the operands; this sequence of two-byte pairs is placed in the message immediately following the sequence of two-byte encoding of subject filter fields. The two-byte pairs can constitute one form of a sequence of bit-string encodings of attribute tests, which can also be used to represent other types of encodings aside from two-byte pairs. Examples of attribute tests are provided below.

The schema for the encoding of the attribute tests is depicted in Table 20. Table 21 illustrates encoding for the two-byte pairs, and Table 22 illustrates encoding of the Operator ID in the two-byte pairs.

TABLE 20

Encoding Rules

1  A zero in the D bit indicates the beginning of a new disjunct in the DNF, while a one in the D bit indicates an additional conjunct within the current disjunct.
2  A value other than all ones in the Notification Attribute Position indicates the position of a predefined attribute (as defined by the channel's notification type) to which the test
   applies; the operand for the test is marshaled as depicted in the example shown in FIG. 18.
3  A value of all ones in the Notification Attribute Position indicates that the test applies to a discretionary attribute, in which case the name length and name of the attribute to which the test applies are marshaled with the operand.
4  The bits for the Operand Type ID encode one of the predefined types for attributes.
5  The bits for the Operator ID encode the operator used in the test, as defined in Table 22.

TABLE 21

| First Byte | | | | | | | |
|---|---|---|---|---|---|---|---|
| 0 | 1 | 2 | 3 | 4 | 5 | 6 | 7 |
| D | Notification Attribute Position | | | | | | |
| Second Byte | | | | | | | |
| 0 | 1 | 2 | 3 | 4 | 5 | 6 | 7 |
| Operand Type ID | | | | | Operator ID | | |

TABLE 22

| Operator | Operator ID |
|---|---|
| Left-open range | 000 |
| Right-open range | 001 |
| Closed-range | 010 |
| Equality test | 011 |
| Positive membership test (in) | 100 |
| Negative membership test (not in) | 101 |

Because the two-byte pair for a test already indicates both the type of the operand of the test and whether or not the test applies to a predefined or discretionary attribute, there is no need to separately marshal the number of tests performed on discretionary attributes or their types. This scheme assumes there are no more than 127 predefined attributes in a notification. Alternatively, this design may use more bits to encode attribute tests.

While this marshaling convention orders and groups attribute tests according to the DNF of the attribute filter, an infrastructure element (such as a router) may choose to evaluate the tests in some other order (perhaps according to dynamically derived local data about the probability of success or failure of the different tests) in order to make the overall evaluation of the attribute filter more efficient. The Subscription ID field of the message is a value generated by the agent for uniquely identifying the subscription to the agent's edge router in subsequent requests to modify or unsubscribe the subscription. In particular, a dynamic modification to the attribute filter of a subscription is propagated using the message format shown in the example of FIG. 18, except that the subject is #.RESUBSCRIPTION and the Subscription ID is that of the previously registered subscription being modified. And an unsubscription is propagated using, for example, the message format of FIG. 18 up through the Subscription ID field, with the subject being #.UNSUBSCRIPTION and the Subscription ID being that of the previously registered subscription being unsubscribed.

Figure 19:
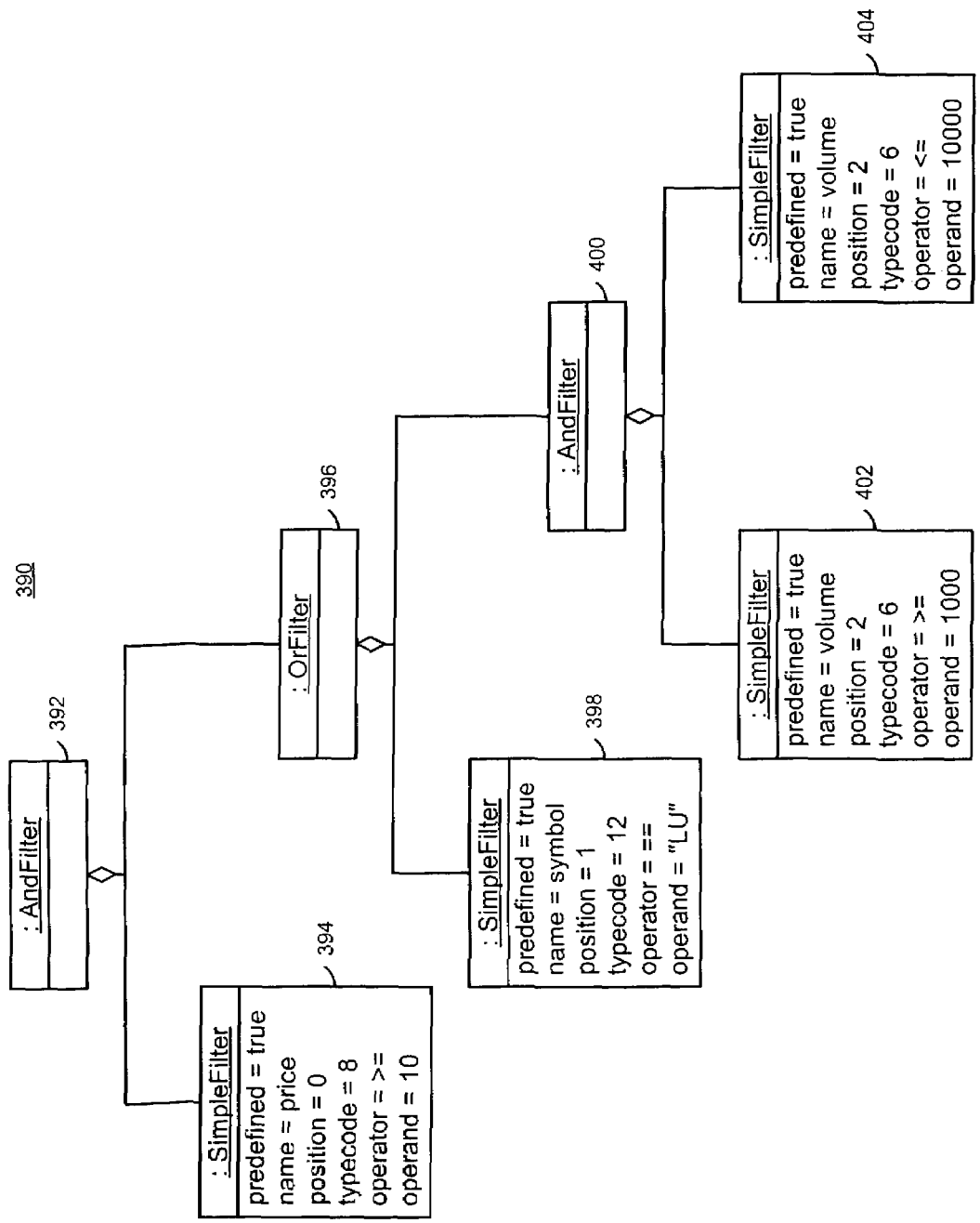
FIG. 19 is a diagram of a database structure for storing subscriptions.

The following provides an example to illustrate the conversion and encoding by the agent as described above. Consider the following example attribute filter expression: price>=10 and (symbol=="LU" or (volume>=1000 and volume<=10000)). FIG. 19 presents a Unified Modeling Language (UML) diagram 390 depicting the objects used by the agent in step 362 to store the expression. This diagram illustrates an hierarchical relationship for specifying the subscription, which can include variables, constant values, or both. The objects in the diagram can be instances of filter classes depending upon a particular implementation. Each SimpleFilter object depicts the values of attributes used to store information about a corresponding attribute test of the filter expression. In the expression of FIG. 19, an OR filter 396 connects two AND filters 392 and 400. The AND filter 392 contains a simple filter 394 with attributes for the subscription. Likewise, the OR filter 396 contains a simple filter 398, and the AND filter 400 contains simple filters 402 and 404.

For the purposes of this example, attributes price, symbol, and volume are assumed to be predefined attributes of the associated channel and are assumed to be defined in positions 0, 1 and 2. respectively. Furthermore, the types of the attributes are assumed to be unsigned integer (typecode 6), character array (typecode 12), and unsigned integer (typecode 6), respectively.

Consider next a subscription containing the above example attribute filter expression as its attribute filter. FIG. 18 presents the marshaling of the subscription into a message. The schematic 386 on the left side of FIG. 18 shows the actual message contents, while the schematic 388 on the right provides a legend for the different parts of the message. The width of each schematic in this example is four bytes. Prior to marshaling, the filter has been converted to its equivalent DNF: (price>=10 and symbol ="LU") or (price>=10 and volume>=1000 and volume<=10000).

The sixteen-bit attribute test encodings are shown as bit sequences, with gaps showing the separation into the different parts. Note that the two tests on price in this example cannot be combined since they are in separate disjuncts, and thus they are marshaled separately as ranges that have no right bound ("right-open ranges"). On the other hand, the two tests on volume can be combined since they are in the same disjunct, and thus they are marshaled together as a single "closed-range" test.

Finally, note also that certain fields are characterized as being "assumed"; this means that values for these fields were chosen arbitrarily for this example and are in general independent of the subscription that was marshaled. In addition, the subject filter for the subscription was arbitrarily chosen to be ">," which matches any subject defined by the associated channel. The example described above and shown in FIGS. 18 and 19 is provided for illustrative purposes only, and the marshalling can be used with any other type of subscription. Also, method 350 provides only one example of marshaling subscriptions, and they can be marshaled in any other way.

Figure 17:
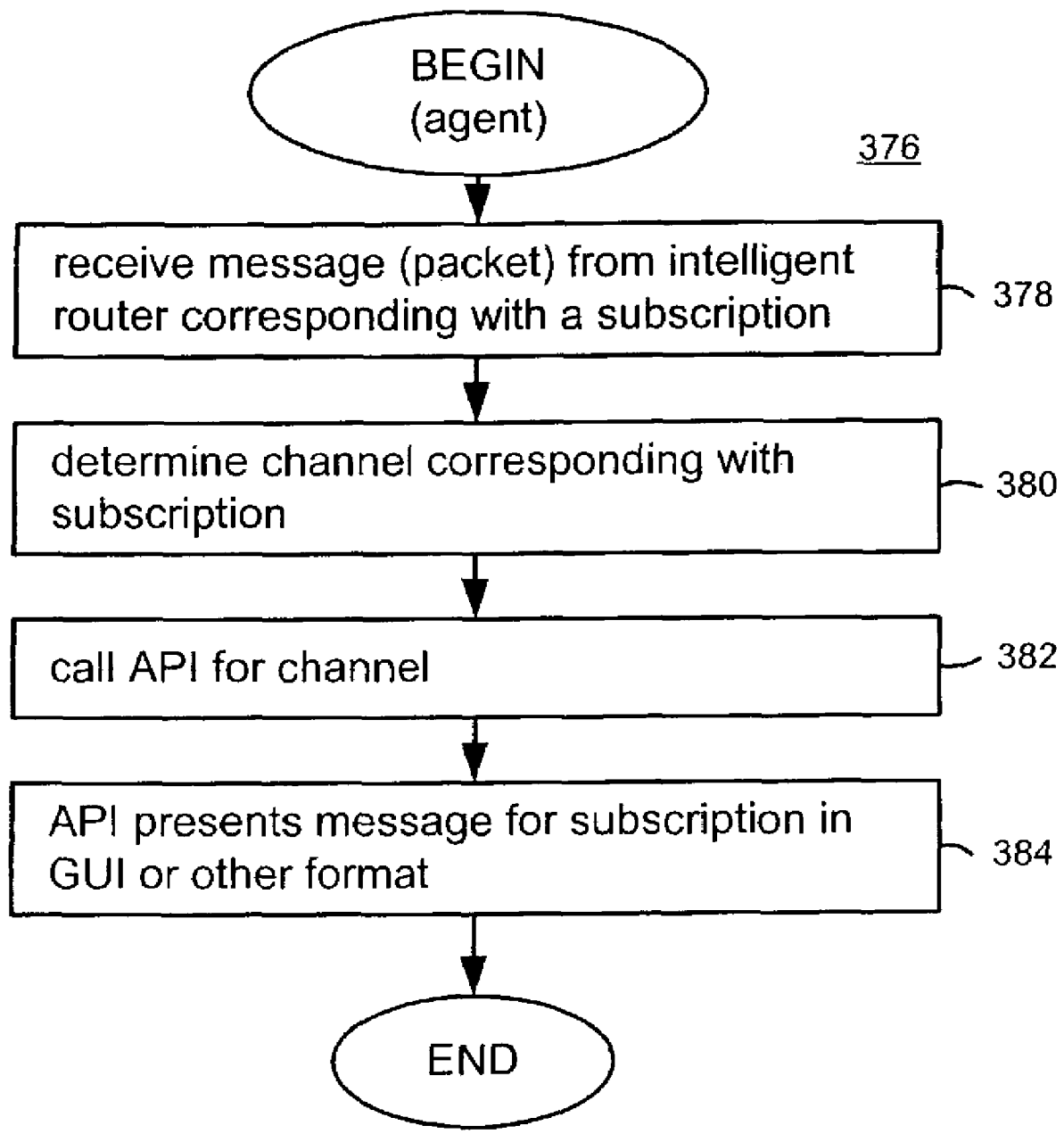
FIG. 17 is a flow chart of an agent method for an incoming message.

FIG. 17 is a flow chart of an agent method 376 for an incoming message. Method 376 can be implemented, for example, by agent 128 and application 126 in user machine 122. In method 376, agent 128 receives a message from an intelligent router corresponding with a subscription (step 378). Agent 128 determines a channel corresponding with the subscription (step 380), for example by the channel ID in the message, and calls an API for the channel (step 382). The API present the data for the subscription in a GUI or other format at the user machine (step 384). The processing of incoming messages can use a process of decoding the data in the reverse of the encoding process described above, and this decoding (reverse encoding) can be performed in a router or in other network entities.

Wildcard Processing

Figure 20:
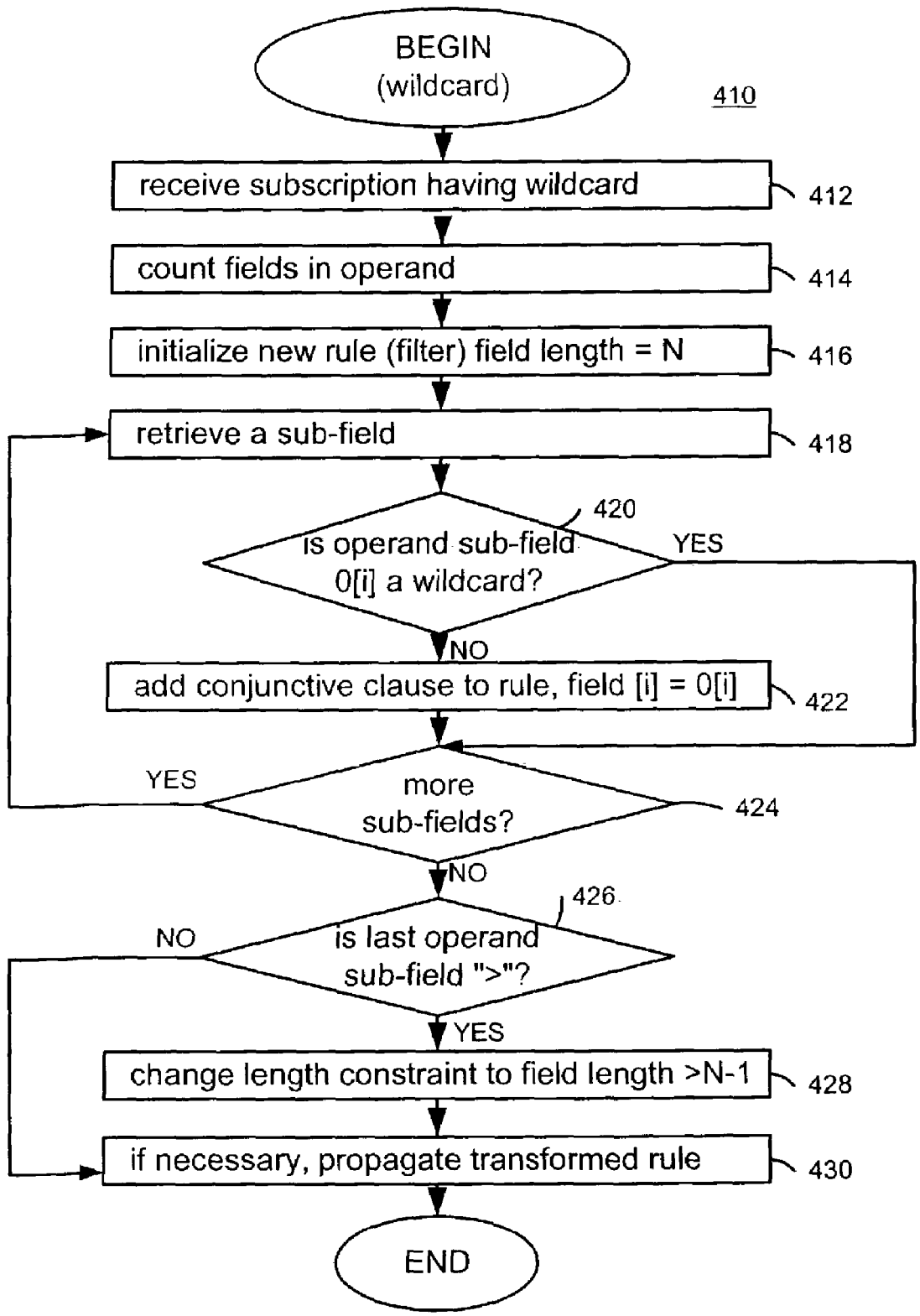
FIG. 20 is a flow chart of a wildcard method.

FIG. 20 is a flow chart of a wildcard method 410. This method illustrates an example of using a set of routing rules for a filter to convert wildcards in expressions for subscriptions. Method 410 can be implemented, for example, in software modules as represented by agent 128 for execution by processor 134 in user machine 122. Alternatively, wildcards can be processed in the network by processor 93 under software control in intelligent router 92 or in the corresponding functions contained in ASIC 91. Wildcards include open fields or variable length fields, examples of which are provided in Table 21.

In method 410, agent 128 or other entity receives a subscription having a wildcard (step 412). The subject length for subscriptions can be specified by a publisher when publishing content, and the subject can be pre-processed on the publisher machine, for example, to count the fields of the subject and thus obtain a field count (length) for it. Agent 128 counts the number of fields in the filter operand (step 414) and initializes a new rule (filter) of field length=N (step 416). Agent 128 retrieves a sub-field for the subscription (step 418) and determines if the filter operand sub-field O[i] is a wildcard (step 420). If the filter operand sub-field is not a wildcard, agent 128 adds a conjunctive clause to the rule, field [i]=O[i] (step 422). If the filter operand has more sub-fields (step 424), agent 128 returns to step 418 to process additional sub-fields. The parameter "i" represents a field where i is an integer representing the field number in this example.

After processing the sub-fields, agent 128 determines if the last filter operand sub-field is a ">" (step 426) and, if so, it changes the length constraint to field length >N−1 (step 428). Wildcard processing can use any type of symbol, and a ">" is only one such example. In this example, a "a.>" can mean a.b, a.c, a.d, etc. and all their sub-subjects at all levels (for example, a.b.x, a.c.x, a.b.x.y, etc.). Other symbols can be used for other implementations of wildcards.

If necessary, agent 128 propagates the transformed rule to intelligent routers or other entities in the network (step 430). Accordingly, the method iterates through the sub-fields in order to process them for conversion of the wildcards to non-wildcard rules, meaning rules that do not contain wildcards. The conversion of wildcards can occur anywhere in the network, for example on the subscriber machine or in an intelligent router. The conversion can thus occur in one entity with the transformed rule propagated to other entities or it can occur dynamically.

Table 23 provides a summary, along with examples, of these exemplary routing rules for processing wildcards. These routing rules can be generated in the intelligent routers, for example, or generated in other network entities and propagated to the intelligent routers. In addition, the routing rules in Table 23 are provided for illustrative purposes only and other routing rules are possible for converting wildcards.

TABLE 23

| Original Rule | Transformed Rule |
| --- | --- |
| subject = "a.b" | subject.length == 2 <br> & subject[0] == "a" & subject[1] == "b" |
| subject = "C.*.D" | subject.length == 3 <br> & subject[0] == "C" & subject[2] == "D" |
| subject = "foo.>" | subject.length > 1 <br> & subject[0] == "foo" |
| subject = "*.*.b.*.c.>" | subject.length > 5 <br> & subject[2] == "b" & subject[4] == "c" |

Filter Propagation

Content-based routing (CBR) is a form of constraint-driven routing. In a publish-subscribe network enhanced with CBR functionality, such as the publish-subscribe networks described above (e.g., see FIGS. 1-3), a subscriber's interest in publications of specific content (i.e., a subscription) are preferably encapsulated in entities called filters.

The filters are preferably used by routers in the network to make routing decisions.

Unlike previous filtering schemes that could only be executed at the edge or the user end, the present CBR scheme capable of operating in the network core involves the propagation of these filters. If subscribers are given the capability to place constraints on the content of the packets they receive, and if these content constraints are used in the core of the network to route packets, both the efficiency and the functionality of the network will greatly benefit from CBR.

The embodiment described herein provides a family of highly scalable filter propagation methods so that (i) the filters can be propagated into, out of, and/or throughout the core routers along the data paths between publishers and subscribers, and (ii) CBR can be conducted upstream, within the network core and not just at the edge of the network, if desirable. By conducting the CBR further upstream (e.g., in the network core, or as far as the publisher's machines), the number of data packets that need to be routed downstream often can be drastically reduced. As a result, the traffic load on the network can be reduced.

The filter propagation methods described herein cover aspects of propagating content filters in any name and any form into, out of, and throughout the core of the network. The propagation of filters has many aspects and involves many issues. One important issue addressed by the filter propagation methods described is avoiding the buildup of large numbers of filters as the filters move "up" the propagation stream from a huge number of filter sources (e.g., subscriber) to a few filter destinations (e.g., core router, edge router or publisher). This issue is otherwise known as the "accumulation" problem, and it happens for example in networks composed of cascaded nodes connected in a tree-like topology.

The solutions designed to address this and other issues may include one or more sets of rules, procedures, policies, processes, mechanisms, protocols, message formats, data structures, and/or algorithms. Through these solutions, filter propagation can be made: fast (e.g., through simplification, merging, efficient marshalling, etc.); scalable (e.g., through merging, approximation, etc.); dynamic (e.g., new subscription, unsubscription, repair, etc.); secure (e.g., authentication); private (e.g., encryption); reliable (e.g., TCP connection, reliable tunnels, encoding, recovery protocol, etc.); flexible (e.g., lazy propagation (see below), various multicast topologies or protocols); and, adaptive to the need of users (e.g., publisher/subscriber behavior-encoding). The filter propagation methods described herein utilize these solutions to achieve these benefits and other benefits.

A. Network Topology—Filter Propagation Strategies

A publish-subscribe system can be implemented with a multicast, broadcast or mobile publish-subscribe strategy. Filter propagation may be embedded in the network topology or executed "on top" of or in addition to the network topology imposed by the strategy chosen for linking publishers and subscribers. Alternatively, the filter propagation strategy may also be the very strategy for linking publishers and subscribers, such as in a publish-subscribe scheme involving advertisements of publications where subscriptions embedded with filters can be delivered directly towards the advertising destinations.

Within the multicast category, the filter propagation may use a protocol consistent with that used for multicast (e.g., protocol independent multicast—sparse mode (PIMSM) and—dense mode (PIMDM), Core-Based Tree (CBT), distance vector multicast routing protocol (DVMRP), multicast open shortest path first (MOSPF), etc.). Depending on the protocol used, the filter propagation can be bi-directional or unidirectional, and many filter propagation strategies are possible. Strategies include one or more the following examples: 1) all filters are propagated to all possible upstream links when they are received (the eager propagation scheme); 2) filter propagation is initiated in response to incoming publishers' packets (the lazy propagation scheme); 3) propagation takes place in response to broadcast advertisements by publishers; 4) propagation takes place after computation of network topology (e.g., MOSPF); 5) filter propagation is periodic (for example, to satisfy the refreshing requirement in a system that supports filter time-outs); 6) filter re-propagation is required during the repair of a fault in the network; 7) filter re-propagation is required during the re-configuration of the network; and/or any combination of the above. The strategies are preferably subject to the filter propagating methods and rules described herein.

B. Link-Level Connection Mechanism for Filter Propagation

The manner in which the source and the destination involved in a filter propagation process are connected may vary. For example, the source and destination involved in a filter propagation process may be connected: 1) hop-by-hop (e.g., router to router); 2) end-to-end (e.g., user machine to cache in an off-line data retrieval); 3) using tunnels; 4) using transmission control protocol (TCP); 5) using user datagram protocol (UDP) (e.g., supplanted with reliable data recovery mechanisms); 6) using a security protocol; 7) using other protocols; 8) taking place only within the kernel at routers and/or user machines; 9) involving only user-level processes at routers and/or user machines; 10) involving both the kernel and user-level processes at routers and/or user machines in all possible combinations (e.g., kernel-to-application, application-to-kernel-to-application, etc.); and/or, 11) any combination of the above.

C. Destination of Filter Propagation

Filters can be injected anywhere in the publish-subscribe network, as given in the following examples: 1) all routers and user machines forming end-to-end connections between publishers and subscribers; 2) every router in the network including the edge routers; 3) core routers only; 4) edge routers only; 5) subscriber machines; 6) publisher machines; 7) administrator machines; 8) cache; 9) backup routers; 10) any routers where packets may be diverted; 11) new routers involved in a network repair or fault recovery; and/or, 12) any combination of the above. The filters are preferably modified through approximation, merging and other processes. For each of the destination categories above, the form of filters being propagated may be different.

D. Source of Filter Propagation

A filter propagation source may be anywhere in the publish-subscribe network. Examples can be found above in section C. Likewise, the filters are preferably modified, through approximation, merging and other processes, during propagation, and so they often take on different forms from different sources.

E. Potential Filter Recipient Behavioral Rules

Filter propagation may also vary depending on the behavior and needs of potential recipients. For example: 1) publishers located at a permanent or semi-permanent location want filters to be propagated towards them; 2) mobile publishers may not want filters to be propagated toward their location because they are moving away soon; 3) small-volume publishers who are only publishing a few publications before logging off do not need filters; 4) large-volume publishers may want filters to be propagated before sending the first sets of publications to save network bandwidth; 5) publishers with restricted access authorization may be denied filter propagation to protect the privacy and confidentiality of the subscribers in that application; 6) core routers implementing a filter time-out strategy need periodic updates from downstream routers; and/or, 7) edge routers that are not in constant connection with the subscriber machines may request periodic updates of subscription or filter interest. All these behavioral properties and others can be differentiated, for example, by using publisher advertisements, encoding publisher behavior in its first publication, periodic transmission of filter updates, and other techniques to convey the need of the filter recipient.

F. Filter Sender Behavioral Rules

Likewise, filter propagation may also vary depending on the behavior and needs of filter senders. For example: 1) a subscriber may only want to submit temporary filters with a (system-defined or user-defined) time-out; for example, if he/she is interested in sampling publications; 2) subscribers are mobile, and filters should expire after the subscribers have moved; 3) subscribers not in constant connection with their edge routers may be requested to send periodic filter updates in a CBR system supporting automatic filter time-outs; 4) some policies may dictate that subscribers need to be authenticated before propagating their filters; 5) routers in a CBR system that supports automatic filter time-outs would need to send periodic filter updates; 6) specific queries for only a fixed set of data may involve or may be implemented by filters (e.g., data from cache responding to a query or subscription, persistence backup data, data being recovered during a fault recovery, etc.); and/or, 7) routers that have modified filters for propagation may indicate to upstream routers how the propagated filters are modified based on sender needs. All these behavioral properties and others can be supported for example by encoding the behavior in the filter propagation messages or by using special protocols (e.g., for authentication).

G. Processing of Filters Being Propagated

The processing of filters may involve transformations that modify the content or representation of the filters and/or management functions that merely organize the filters. The original filter expressions in a subscription may undergo different sets of processing procedures in different parts of the data delivery path, which includes the following path sections: 1) from the subscriber machine to the edge router; 2) from the edge router to a core router; 3) between two core routers; 4) from a core router to the edge router on the publisher end; and, 5) from the edge router to the publisher machine. Some examples of these transformation processes are described above (e.g., see Agent Processing and Wildcard Processing). These processes may be executed throughout the publish-subscribe network, e.g., on subscriber machines, publisher machines, edge routers or core routers. Components such as agents (on subscriber and publisher machines) and daemons (on routers) may execute these processes.

The processes may include the following examples: 1) attribute content translation (e.g., from subject names to subject ID, from strings to their lexicographical values, from one currency to another); 2) expression expansion (e.g., from wildcards to their constituents); 3) expression translation (e.g., >operator to >=operator, !=operator to >and <operators); 4) transformation of representations (e.g., from a string representation to a numeric or symbolic representation, such as a polish notation, notations involving brackets, or to a representation pertinent to the specific data structure used for storing or matching filters, such as a tree, a radix trie, etc.); 5) encoding/decoding (e.g., checksum); 6) encryption/decryption; 7) machine-level marshalling and un-marshalling; 8) protocol-level marshalling into and un-marshalling from pre-defined filter propagation message format; 9) decomposition (e.g., into Disjunctive Normal Form (DNF)); 10) simplification to remove redundant predicate expressions (e.g., $1>5 && $2>3 && $1>3); 11) subsumption of two or more filters; 12) approximation of a filter before and/or after merging; 13) merging of two or more distinct filters (e.g., based on approximation); 14) grouping of two or more distinct filters (e.g., for propagation to different uplinks); 15) un-subscription or removal of filters; 16) expiration of filters; 17) delta updating of filter (e.g., bookkeeping an old filter set in any representation and subtracting from it the new one to obtain the changes in the filter configuration, i.e., the delta update); and/or, 18) formation of filter patterns (e.g., filter 2 to be matched if filter 1 is matched). Any process involved in filter propagation, listed or unlisted above, may be utilized by the filter propagation method described herein. .

H. Content and Format of a Filter Propagation Message

A message may be used to send or propagate a filter. The content and format of the message containing the filter being propagated may be affected by the transformation processes the filter has undergone and, during its propagation, the circumstances triggering the filter propagation. The following are exemplary formats: 1) any message layout at machine or user level; 2) filters may involve attributes in fixed or random positions (e.g., string matching with any part of the publication); 3) filters may involve fixed-size (e.g., integer, boolean, etc.) or variable-size attributes (e.g., arrays, strings, c structures, etc.); 4) filters may involve simple (e.g., integer, boolean, etc.) or complicated data types (e.g., arrays, strings, range variables, etc.); 5) filters may involve simple (e.g., >, ==, <=, etc.) or complicated tests or operators (e.g., membership test, regular expressions, string matching, range operators such as intersection queries, enclosure queries, containment queries, etc.); 6) decomposed DNF format; 7) simplified or original representation of filters; 8) compact or expanded format (e.g., a one-sided filter can be represented using a 2-limit expression or a two-side filter can be rewritten as two one-sided filters); 9) partial representation of filters (e.g., truncation of string predicates, reduction of data type resolution, and reduction in the number of attributes); 10) transformed representation of filters (e.g., polish notation, brackets, tree, trie, etc. ); 11) inclusion/exclusion of the subject field (e.g., subject filtering could already be implemented by the multicast backbone on which filter propagation takes place); 12) expansion of wildcard subject or attribute predicates; 13) translation of content or expression; 14) encoding information (e.g., error-correcting checksum, etc.); 15) encryption; 16) full set of filters (e.g., during a fault recovery, refreshing updates in a system with filter time-outs); 17) partial set of filters (e.g., subsumed filters, only new filters to be inserted or old filters to be removed); 18) modified set of filters (merged filters, approximated filters); 19) delta changes in the filter representation that do not resemble the filters (e.g., changes in a radix tree during the insertion and removal of filter); 20) identification label of a filter instead of its coordinates (e.g., during an un-subscription); 21) time-out parameters for filters; 22) filter patterning information; and/or, 23) information encoding the behavior and the requests of filter sender as described in section F. This list represents only a sample of possible content and formats of a propagated filter that may be used in the methods described herein.

I. Procedures and Policies for Filter Propagation

At the system level, policies and procedure may be instituted to govern or some all aspects of filter propagation. These aspects may include, for example: 1) administering (e.g., global shutdown and restart); 2) maintenance (e.g., fault recovery); 3) filter persistency (e.g., expiration time-outs, one-time filtering of cached data); 4) performance enhancing policies (e.g., load balancing, edge selection, eager versus lazy propagation); 5) monitoring (e.g., fault reporting); 6) accounting (e.g., statistical bookkeeping); 7) billing; 8) regulating (e.g., authority to propagate filters, type of filters allowed in the network, etc.); 9) user authentication; 10) user assistance (e.g., directory service for subject filtering); 10) subscriber privacy (e.g., filters should be hidden from others); 11) synchronization (e.g., acknowledgment to subscribers when filters are received by the edge router, acknowledgment to subscribers when the filter propagation is completed, acknowledgment to repairing routers during recovery, etc.); 12) prioritization, and/or 13) any policy determining and regulating automatic filter injection (e.g., consumer relation management which automatically injects filters that may be of interest to consenting customers, based on the interest shown in the filter set they have injected themselves).

Many aspects and possible features of filter propagation have been thoroughly discussed above in Sections A to I. The feasibility of filter propagation, however, rests on finding a scalable solution to the "accumulation" problem described above. A method and apparatus to implement scalable filter propagation is provided as follows.

Figure 21A:
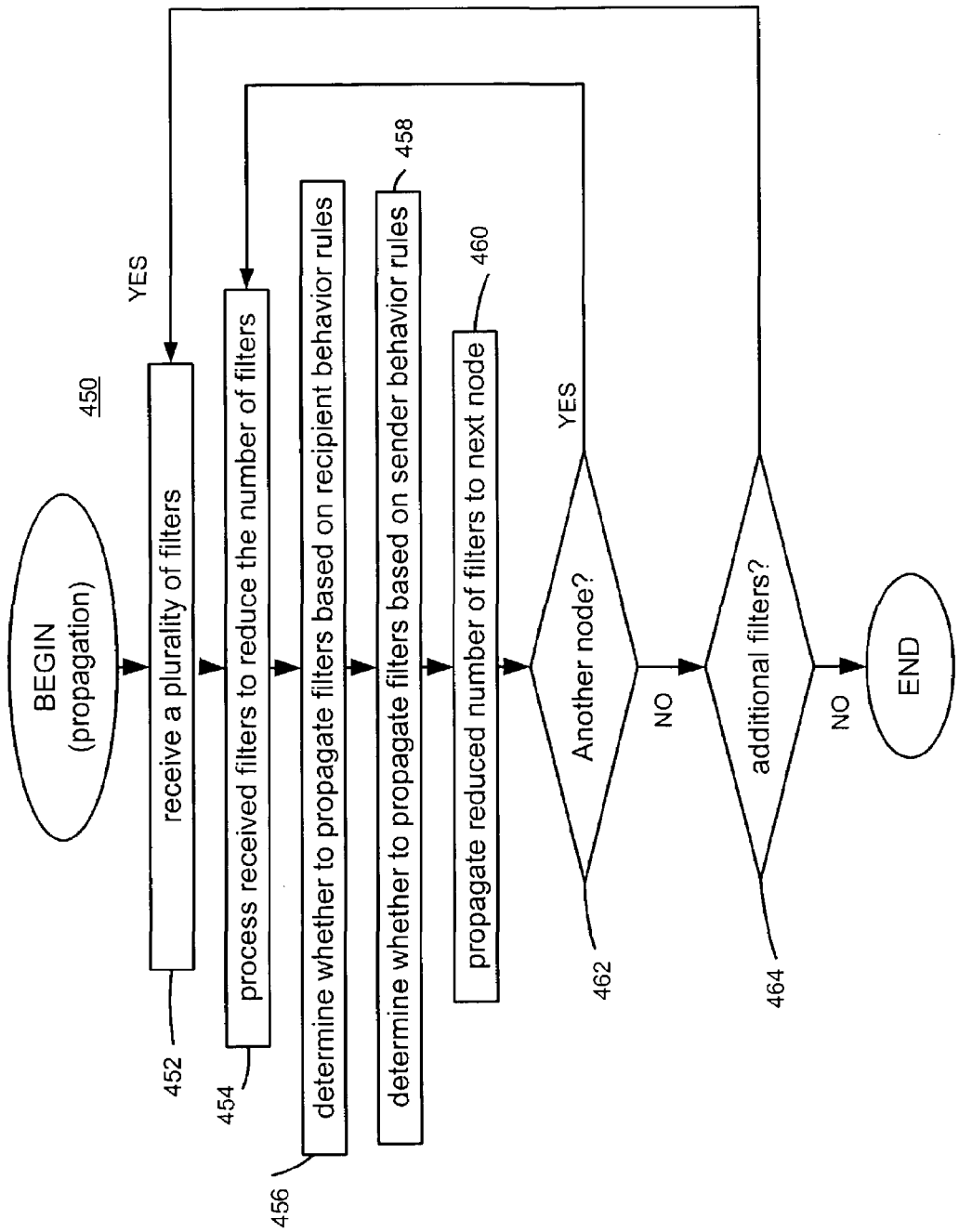
FIG. 21A is a flow chart of a filter propagation method.

As discussed above, an important issue in filter propagation is avoiding the buildup of large numbers of filters as the filters move "up" the propagation stream from a huge number of filter sources (e.g., subscriber) to a few filter destinations (e.g., core router, edge router or publisher). This issue is otherwise known as the "accumulation" problem, and it happens for example in networks composed of cascaded nodes connected in a tree-like topology. FIG. 21A illustrates a filter propagation method 450 that addresses the filter accumulation problem. The method 450 illustrates an example of using a set of the solutions described in sections A-I above for propagating filters in a publish-subscribe network. The method 450 can be implemented, for example, in software modules as represented by an agent 128 for execution by a processor 134 in a subscriber machine 122. Alternatively, the method 450 can be executed by a processor 93 under software control in an intelligent router 92 or in the corresponding functions contained in ASIC 91. Further, the method 450 can be executed by a combination of these.

As shown in FIG. 21A, a plurality of filters is received (step 452). As described above in section C, the filters may be injected anywhere in the publish-subscribe network. The received filters are processed to reduce the number of filters (step 454). The reducing step reduces the number of filters being propagated in order to avoid or reduce the filter accumulation problem. If too many filters are accumulated at one node in this publish-subscribe network, as in cases where there are a lot of immediate downlink nodes to the current node, or where the current node is at a very late stage of the filter propagation path, publishers and routers can be overwhelmed and network efficiency will suffer because of the huge computational load required to process and match all the filters.

The following further illustrates the effect of the filter-reducing step 454. There are many downstream nodes and only one or a few upstream nodes involved in each stage of the propagation path. If each downstream node at a particular stage reduces the number of filters it will propagate to an upstream node by a factor close to or not much smaller than the number of downstream nodes at that stage, the total number of filters accumulated at the upstream node will be of the same order of magnitude as the number of filters of each of its downstream nodes. By induction, it can be seen that this reducing factor ensures that the number of filters at each destination of the filter propagation will never grow much faster than the number of stages in the propagation path, thus effectively solving the accumulation problem.

Figure 21B:
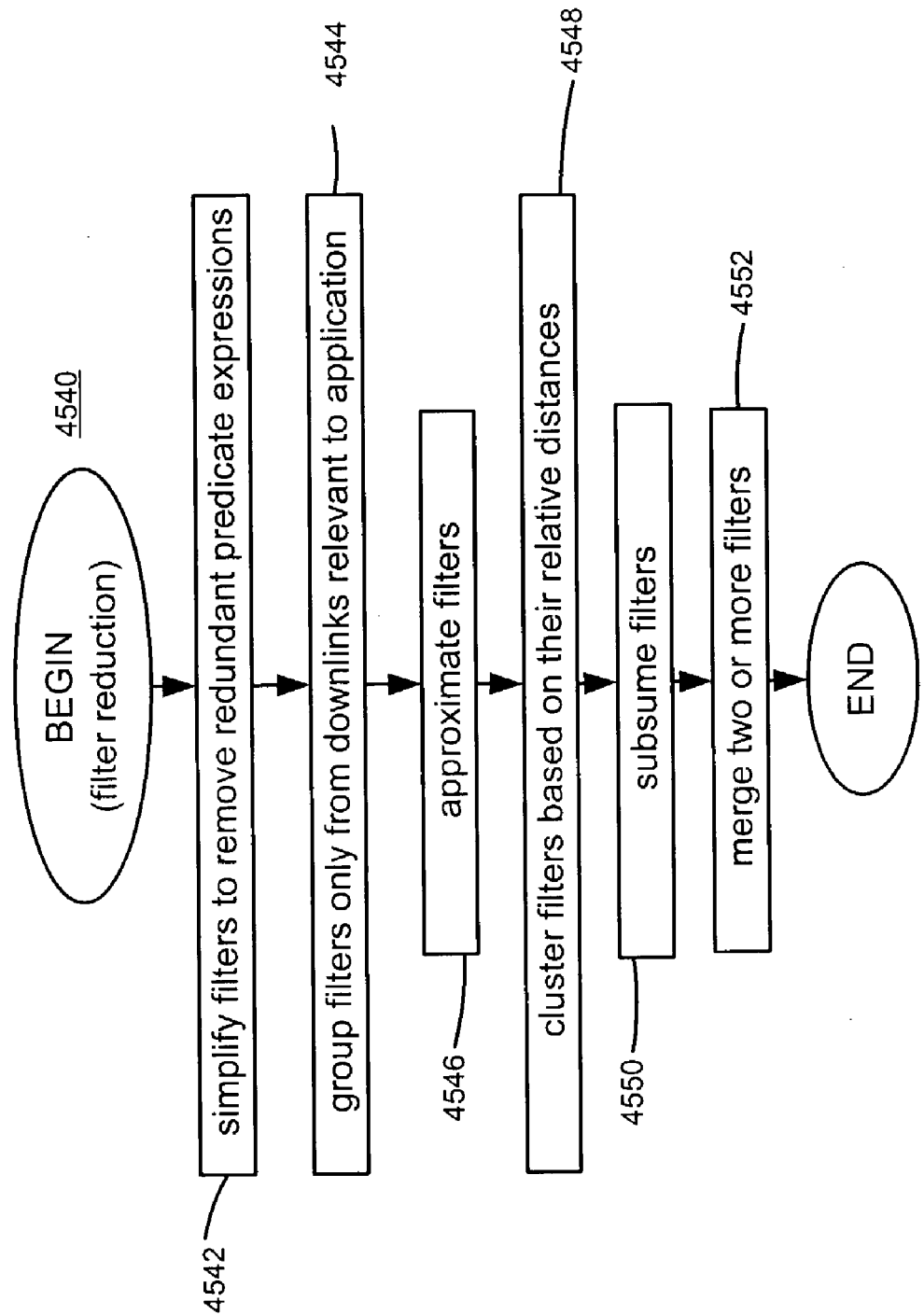
FIG. 21B is a flow chart of a filter reduction method.

FIG. 21B illustrates preferred sub-steps of the reducing step. These sub-steps preferably include simplifying filters to remove redundant predicate expressions (step 4542), grouping filters coming only from downlinks relevant to a subject (step 4544), and within this group of filters, approximating filters (before or after merging) (step 4546), clustering filters according to their relative distances (step 4548), subsuming filters (step 4550), and merging of two or more filters (step 4552). These steps may be performed in a different order than shown, and some of these steps may be omitted. Simplification is described above in Agent Processing, with reference to FIG. 16.

The filter grouping step 4544 is important for sending the correct filter information upstream. Some examples of its importance are given below. For example, a router may have many downlinks (e.g., links to downstream routers). Not all of the downlinks have subscribers sending subscriptions or filters to them. For another example, in a bi-directional multicast scheme, each link to a router can serve as both an uplink and a downlink because publishers and subscribers are allowed to join the network from any arbitrary direction. When a filter request is received from a link, this link should be regarded as the current uplink, and only filters injected from those downlinks belonging to the same subject and apart from the current uplink should be grouped for subsequent approximation, clustering, subsumption and merging operations.

Grouping 4544 may also be needed for other purposes, such as accounting and network traffic control. It may even be omitted altogether in some situations, for example, when the global map of filters coming from all the links is required for any reason.

Approximation, step 4546, modifies filters to capture more, rather than fewer, publications. For example, approximation may reduce the number of predicates in the representation of the filter being propagated, reduce the resolution of the filter coordinates, or truncate a long string to the first 12 characters. Approximation has the effect of aligning the formats of the filters so that they may become better candidates for subsumption and merging (steps 4550, 4552). The approximation step also reduces the size of the message propagating the filter.

Subsumption, step 4550, eliminates filters that are a sub-set of another filter. For example, if a first filter is for all condos with an area greater than or equal to 1000 $ft^2$ and less than or equal to 1300 $ft^2$ and a price range of greater than or equal $200K and less than or equal to $300K, and a second filter is for all condos with an area greater than or equal to 1100 $ft^2$ and less than or equal to 1200 $ft^2$ and a price range of greater than or equal $225K and less than or equal to $275K, the second filter is a subset of the first filter and, therefore, is eliminated by subsumption.

Steps 4542, 4544, 4546, 4548, 4550, and 4552 may be performed in any order, depending on the specific filter reduction scheme and/or algorithm chosen. For example, that steps 4546 and 4550 may be interchanged. Approximation may take place after subsumption. Further, steps 4550 and 4552 may be integrated and performed as a single step. For example, merging could include subsumption, as shown in the graphs below.

With continued reference to FIG. 21B, merging, step 4552, is similar to subsumption in that it combines two or more filters. Merging, however, may use approximation to combine two or more filters that are partially or completely distinct. Viewing various filters geometrically illustrates this process. For example, see Graphs 1-4 in FIG. 21E.

Graph 1 geometrically illustrates two filters, s1 and s2. that may be reduced through subsumption, since filter s2 is a sub-set of filter s1. as described above. In graph 2, however, neither filter s3 or filter s4 is a sub-set of the other. Rather, filters s3 and s4 partially overlap. The merging step 4552 merges s3 and s4 by approximating the minimum filter sA that encompasses both s3 and s4. Since s3 and s4 are both sub-sets of sA, s3 and s4 are subsumed into sA. Graph 3 illustrates another example of merging; in graph 3. filters s5 and s6 are completely distinct. The merging step 4552 approximates a filter sA that includes s5. s6 and the area between these filters. Filters s5 and s6 are then subsumed into sA. Graph 4 illustrates yet another example of merging in which the filters s7 and s8 are only partially distinct for one attribute. Since s7 and s8 overlap for one attribute and have the same value for the other attribute, the merging step 4552 simply merges the two filers together into sA, subsuming the overlapping portion.

As can be seen, subsumption (step 4550) and merging (4552) depend on locating filters close to one another. To obtain efficiency over that of a linear search through the entire list of filters, clustering algorithm may be used as an optional step (step 4548) to collect filters with boundaries close to or overlapping one another. The clustering algorithm can be performed incrementally in real time as filters are added or removed. Fixed-size or variable-size grids of any granularity over the attribute space of filter attributes can also be used to group filters based on their respective grid coordinates.

The portions of sA that are not covered by either s3 or s4 or s5 and s6 are referred to as the leakage area (or relaxation area, redundant area, etc.), in that these portions will capture publications that are not requested by s3 or s4 or by s5 or s6. The merging step 4552, therefore, sacrifices or trades leakage for filter reduction. However, as greater approximations are made, the leakage area may reach a point at which it is too large to be offset by the benefits of filter reduction. Therefore, the publish-subscribe network in which the method 450 is being executed preferably has a defined leakage area threshold that is used in the merging step 4552 to determine whether the leakage area for each approximation is too large. The merging step 4552 preferably performs a statistical analysis on the leakage area to determine what anticipated percentage of additional packets will be received due to the approximation (i.e., packets falling into the leakage area). This statistical analysis may be based on packet distribution profiles built using a history of incoming packets or that of outgoing packets (e.g., at the router performing the method 450). If the anticipated percentage exceeds the leakage area threshold, the approximation is not used.

The leakage threshold is typically a percentage figure, and more than one threshold can be used as criteria for merging. For one example of leakage threshold, in Graph 3. if leakage threshold #1 is specified as 10% of the number of packets that would be accepted by the actual filters s5 and s6 involved in the merging step 4552, and if it is estimated that the leakage area might contain 20% of the total packets falling in filters s5 and s6. the merging operation may be disallowed. For another example of the leakage threshold, in the same graph, if leakage threshold #2 is 2% of the total number of packets passing the router, and if it is estimated that the gap between filters s5 and s6 might constitute 1% of the total number of packets passing the router, the merging operation may be permitted even though the first leakage threshold (#1) is exceeded, because the overall leakage is still a small percentage of the packets that would consume the bandwidth downstream if they are routed without filtering. A large number and variety of interplays between various leakage thresholds can be designed and specified.

The leakage area threshold may be dependent on the number of filters merged, the area of the filter coverage, or any characteristics of the filter distribution. For example, when the total number of filters is small, a tighter constraint may be used for merging filters, as the accumulation problem is not imminent.

As illustrated by graph 4 above, it should be noted that not all merging operations are approximate. A merged filter sA, that is composed of two or more distinct filters, may have zero leakage area in certain situations and is therefore exact. For example, assuming two-dimensional filters (i.e., s7 and s8 in Graph 4), when the two rectangles representing the filters are aligned with and contiguous to each other, leaving no gap between them, the merging step 4552 resulting in filter sA will be exact. In general, in multiple dimensions, this situation could happen if two or more filters have overlapping or intersecting predicated ranges for one attribute and the same predicated range for any other attribute. Likewise, if the predicated range for a filter begins at the next possible value (e.g., for an integer-only attribute) after the predicated range for another filter ends, these filters may be approximated by a merged filter sA with zero leakage area, assuming the same predicated range for any other attributes of these filters. Referring back to FIG. 21A, the method 450 may alternatively include additional filter processing (in addition to that in step 454), such as the filter processing described in section G above. As shown, the method 450 determines whether to propagate the filters based on recipient behavioral rules (step 456), examples of which are given in section E above. The determining step 456 preferably checks whether filters (and/or what filters) are to be propagated to the potential recipient. For example, the potential recipient may be a mobile publisher that has sent a request not to propagate filters to the node (e.g., edge router) to which it is attached. Alternatively, the potential recipient may be a new publisher that has sent a request to propagate all filters to the node to which it is attached before it will start publishing a huge amount of content. Other potential recipient behavioral rules, such as those listed in section E, may be used. The order of steps 458 and 456 is interchangeable. Additionally, some steps such as step 454 (specifically, the merging substep 4552) and step 456 are optional, for example, for a limited number of subscriptions (i.e., filters) or a network composing only a few stages of propagation because filter accumulation is not yet a serious problem.

A determination whether to propagate the filters based on sender behavioral rules (step 458), examples of which are given in section F above, may also be made. For example, the filter sender may have included a filter time-out. In this case, the determining step 458 checks the filter to see if the filter has expired. Also, the filter sender may need to be authenticated for the filter to be propagated to the next node. In this case, the determining step 458 may reject the filter if its origin cannot be authenticated. Other filter sender behavior rules, such as those listed in section F, may be used.

As described in section D, this filter propagation procedure 450 may be initiated from anywhere in the publish-subscribe network, including the network administrator. The full set or the reduced number of filters is propagated to the next node (step 460). As described above in section C, the next node (the filter recipient) may be anywhere in the publish-subscribe network. The number of filters may be reduced by each of steps 454 to 458. Indeed, the number of filters could be reduced to zero by steps 456 or 458 (e.g., based on a potential recipient rule that says do not propagate any filters). The method 450 may also propagate 460 based on one of the filter propagation strategies for the publish-subscribe network, as described in section A above. Consequently, the propagation step may include determining filter propagation strategy and propagating filters based on satisfaction of a requirement(s)

of the determined filter propagation strategy. For example, propagation 460 may take place upon receipt of filters or may only take place in response to broadcast advertisements by publishers. Likewise, the method 450 may be executed according to any of the policies and procedures listed in section I above. The method 450 may also format the filter propagation message according to section H above. The manner in which the source and the destination involved in a propagation step 460 are connected may vary, as described in section B above.

After propagation 460, the method 450 may determine if there is another potential recipient (another node) (step 462). If there is another potential recipient, the method 450 determines whether there is any need to repeat the procedure for this potential recipient. There are cases in some publish-subscribe network strategy (e.g., CBT) where filters have no expiration time-outs, and once they have been propagated to one node, they will remain persistent over that link until some changes to the filter set (e.g., filter addition, filter removal, etc.) take place. In those cases, filter propagation becomes unnecessary for that link. One example can be found in the lazy propagation method described below.

If filter propagation is needed, the method 450 may determine whether to propagate based on the behavioral rules, steps 456 and 458. The method 450 may repeat until there are no further potential recipients of reduced filters.

Figure 21C:
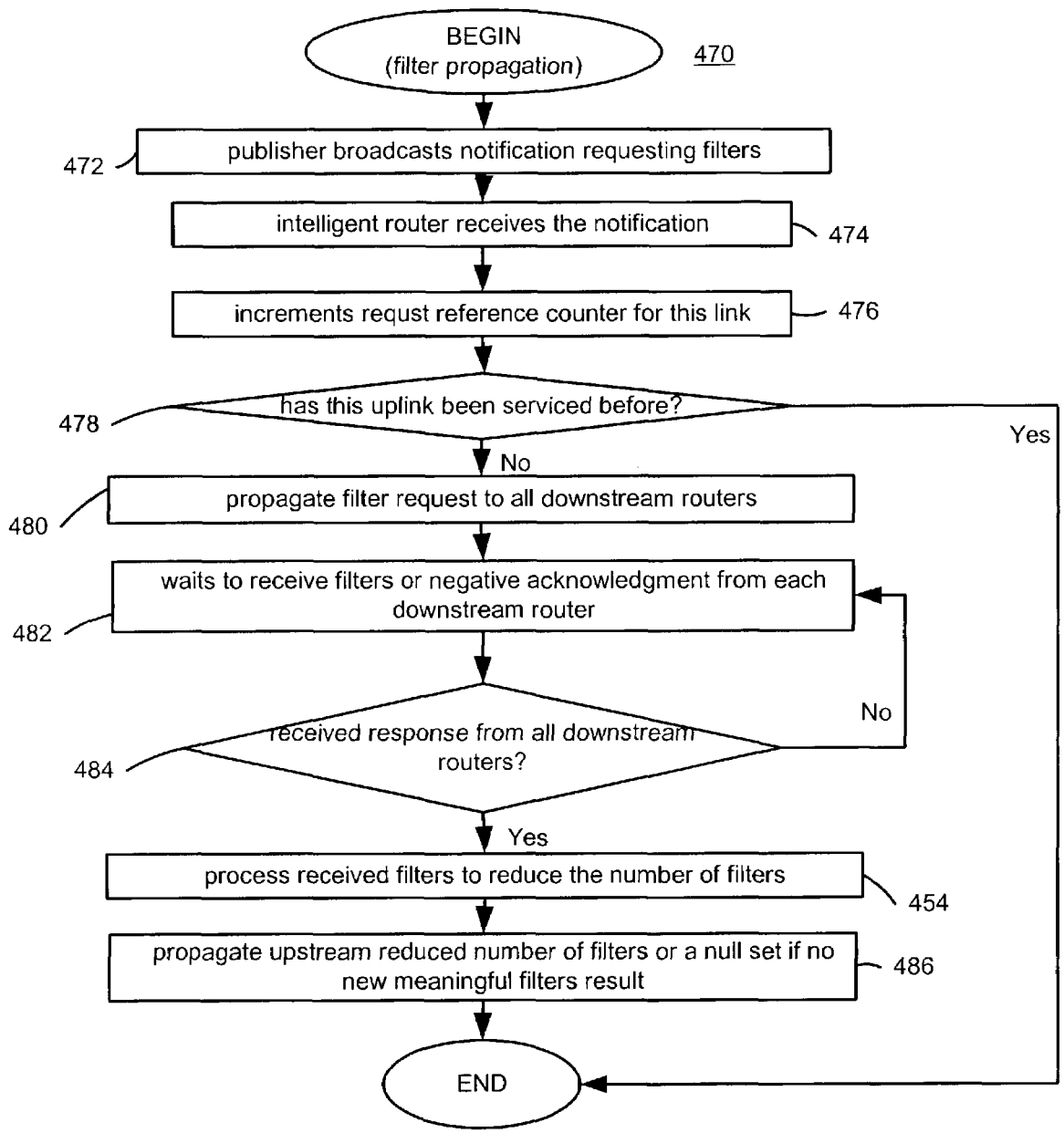
FIG. 21C is a flow chart of another filter propagation method.

FIG. 21C illustrates another filter propagation method 470. This method illustrates another example of using a set of the solutions described in sections A-I above for propagating filters in a publish-subscribe network. The method 470 can be executed by a processor 93 under software control in an intelligent router 92 or in the corresponding functions contained in ASIC 91. Alternatively, the method 470 can be implemented, for example, in software modules as represented by an agent 128 or 105 for execution by a processor 134 or 114 in a subscriber or publisher machine 122 or 100.

Figure 21D:
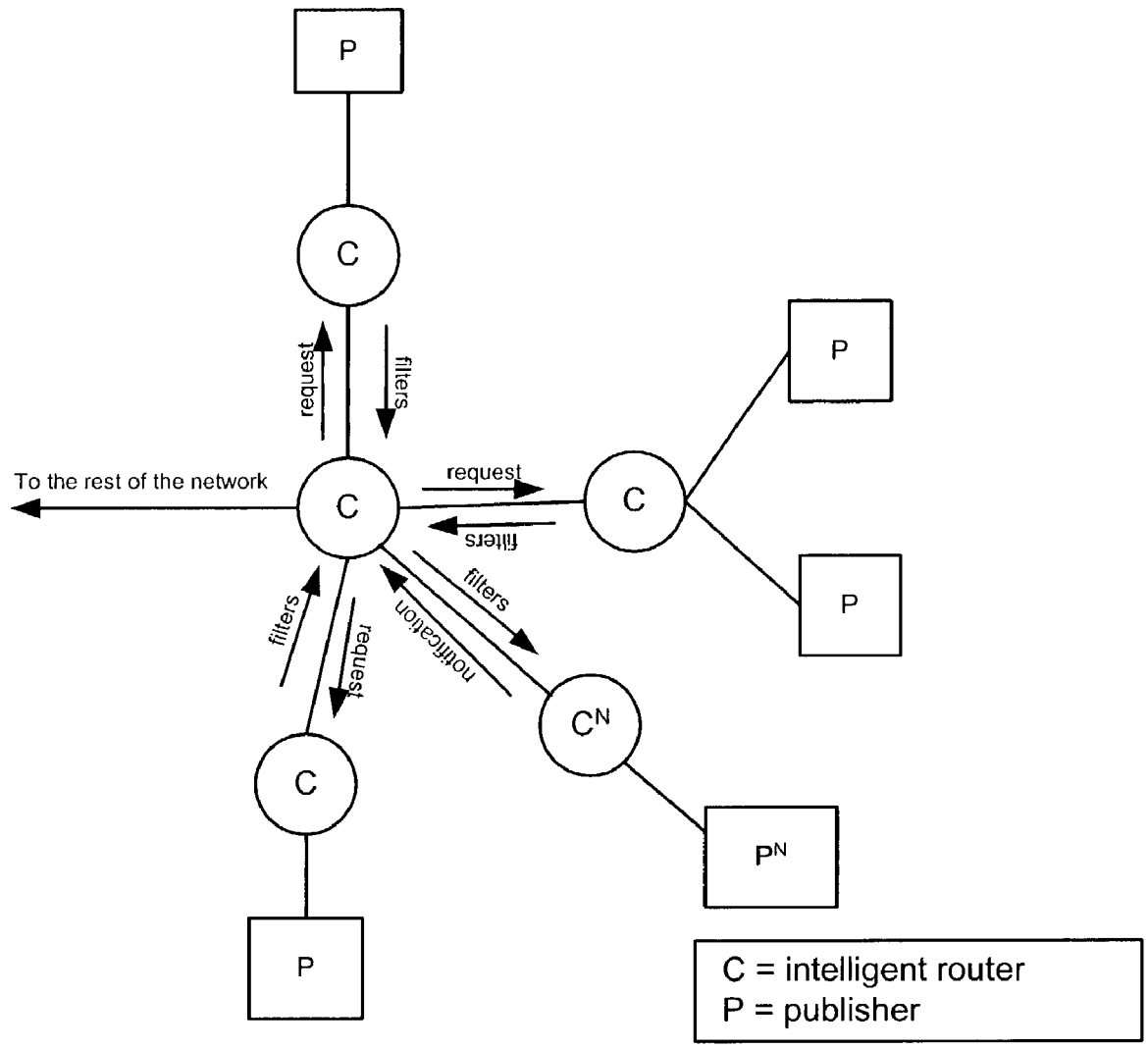
FIG. 21D is a diagram of a publish-subscribe network topology.
Figure 21E:
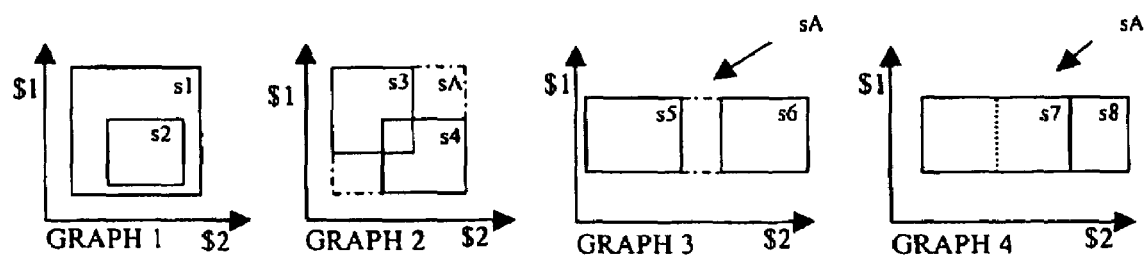
FIG. 21E are graphs illustrating the merging of filters.

In this example, the network topology is a bi-directional topology with a series of publishers P attached from any arbitrary direction and via any arbitrary path to a network of intelligent routers C, as seen in FIG. 21D. Such a network may be implemented for example by a Core-Based Tree multicast scheme. In the example, a new publisher, $P^N$, and a new router $C^N$, are attached to the network at a router C. The new publisher $P^N$, in its effort to connect to a particular publish-subscribe network may need to connect to the core through a series of new routers that will form an extension of that network and/or may connect through routers that are already part of that network. For illustrative purposes, only 1 new router $C^N$ is shown in FIG. 21D.

The filter propagation process takes place in 2 stages. In the bi-directional network shown in FIG. 21D, any link can be an uplink or downlink at the same time. For the purpose of the current discussion, the uplink (only one) is defined as the link from which the current filter request is received and a downlink (among many) the link to an immediately downstream recipient of the filter request away from the uplink. Upstream and downstream are directions defined in the same sense as uplink and downlink.

With reference to FIG. 21C, in the first stage, the new publisher $P^N$ broadcasts or multicasts to the downstream router C (or all downstream nodes) a notification requesting filters (step 472). After the filter request is received by the router C (step 474), the router C updates its bookkeeping to ensure that the same set of filters will not be sent twice to the same uplink, preferably by means of reference counting (step 476). The router C then determines whether filter request from this uplink has been serviced before, preferably by means of examining the reference counter for this uplink (step 478). If this is a new uplink that has never been serviced before, as in the case of the first publisher joining the network from this uplink, the router C will relay the request to (step 480) and await a response from the router's downlinks (i.e., downstream routers) (step 482). Those downstream routers in turn transmit the request to their downstream routers and await their response. This process is repeated until the receiving node could make a decision to respond. This completes the first stage.

The second stage begins when any node that receives a filter request has collected the response from all of that node's downstream routers or when that node is the final node in the network and no response is expected from downstream (step 484). If there are no filters to send, a negative acknowledgment (or a null filter set in any representation) will be sent upstream. If all the new filters have been received from all the node's downstream routers, the entire or partial set of filters (e.g., delta changes) will be sent upstream (step 486) after optional filter reduction (step 454). Only filters collected from the downlinks with respect to the current uplink will be grouped, merged and reduced, according to method 450. This collect-and-then-propagate process is then repeated upstream until the publisher or the initial router sending the filter request receives the filters or the negative acknowledgments from all that publisher's or initial router's downstream routers. The actual propagation of filters or a null set (negative acknowledgment) as described above constitutes the second stage. The two stages differ in their propagation direction as well as the propagated content, and they can overlap in time as the filter request could go further down some branches of the network than others.

Because this filter propagation scheme only initiates the filter propagation process upon reception of a filter request from an uplink, rather than eagerly pumping filters to every uplink, it may be known as a lazy propagation scheme as it pumps filters to only the upstream router requesting filters and only when it requests them. It is noted here that the filter request may not need to be a special-formatted notification. The first notification from any publisher can be regarded as an advertisement of its presence, and the filter recipient behavioral rules encoded and embedded in the data notification can be used to determine if filters are being requested, according to Section E.

Each publisher P's filters may be stored at the publisher user machine 100 or at the router C to which the publisher P is connected. As with the method 450 above, the method 470 may also use additional solutions such as those described in sections A-I above.

While the present invention has been described in connection with an exemplary embodiment, it will be understood that many modifications will be readily apparent to those skilled in the art, and this application is intended to cover any adaptations or variations thereof. For example, various types of publisher machines, user or subscriber machines, channels and configurations of them, and hardware and software implementations of the content-based routing and other functions may be used without departing from the scope of the invention. This invention should be limited only by the claims and equivalents thereof.

The invention claimed is:

1. A method for propagating filters in a publish-subscribe network, comprising:
receiving, at a router, a plurality of filters from one or more nodes relating to subscriptions to content in the network, wherein a filter of the plurality of filters describes a set of events that a subscriber is interested in receiving;

the router reducing a number of the filters based upon particular criteria; and the router propagating in the network the reduced number of filters for use in satisfying the subscriptions to content; wherein the propagating step includes propagating the filters using one or more of a plurality of particular procedures chosen from a list consisting of: an eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

2. The method of claim 1 wherein the reducing step includes one or more of:
performing an approximation operation on one or more of the plurality of filters; and
performing a merging operation on one or more of the plurality of filters.

3. The method of claim 2, wherein the performing a merging operation step includes determining whether a merged filter will exceed a packet leakage threshold.

4. The method of claim 1 wherein the receiving step includes receiving the plurality of filters via a content-based routing network.

5. The method of claim 1 wherein source and destination nodes for the propagation are connected using one or more of a plurality of particular mechanisms chosen from a list consisting of: hop-by-hop, end-to-end, using tunnels, and using transmission control protocol.

6. The method of claim 1, further including injecting the filters at one or more of a plurality of particular locations in the network.

7. The method of claim 1 wherein the propagating step includes propagating the filters based upon one or more of a plurality of particular behaviors of an intended recipient, the behaviors chosen from a list consisting of: mobile, permanent, and temporary.

8. The method of claim 1 wherein the propagating step includes propagating the filters based upon one or more of a plurality of particular behaviors of a sender of one or more of the filters, the behaviors chosen from a list consisting of: mobile, permanent, and temporary.

9. The method of claim 1, further including performing one or more of a plurality of particular processing steps on one or more of the filters, the processing steps chosen from a list consisting of: attribute content translation, expression expansion, expression translation, transformation of representations, encoding/decoding, and encryption/decryption.

10. The method of claim 1, further including formatting a message containing one or more of the filters according to one or more of a plurality of particular formats.

11. The method of claim 1 wherein the propagating step includes propagating the filters according to one or more of a plurality of particular policies or procedures chosen from a list consisting of: administering, maintenance, filter persistency, performance enhancing policies, monitoring, and accounting.

12. The method of claim 1, wherein the propagating step includes:
determining a network topology underlying a filter propagation strategy, wherein the underlying network topology includes one or more of a plurality of requirements for filter propagation that must be satisfied in order to propagate filters; and propagating the reduced number of filters based on satisfaction of the requirement of the determined filter propagation strategy.

13. The method of claim 12, wherein the determined filter propagation strategy is one of a list consisting of: eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

14. The method of claim 1, wherein the receiving step receives the plurality of filters at a core router in the network.

15. The method of claim 1, wherein the receiving step receives the plurality of filters at an edge router in the network.

16. The method of claim 1, wherein the receiving step receives the plurality of filters at publisher machine in the network.

17. A router for propagating filters in a publish-subscribe network, comprising modules for executing the method of claim 1.

18. A publish-subscribe network comprising a plurality of routers that include modules for executing the method of claim 1.

19. A publish-subscribe network comprising a plurality of user machines that include modules for executing the method of claim 1.

20. An apparatus for propagating filters in a publish-subscribe network, comprising:
a filter receiving module, wherein the filter receiving module receives a plurality of filters from one or more nodes relating to subscriptions to content in the network, wherein a filter of the plurality of filters describes a set of events that a subscriber is interested in receiving;
a filter reduction module, wherein the filter reduction module reduces a number of the filters by merging one or more filters of the plurality of filters based upon particular criteria; and
a filter propagation module, wherein the filter propagation module propagates, in the publish-subscribe network, the reduced number of filters for use in satisfying the subscriptions; wherein the filter propagation module includes instructions for propagating the filters using one or more of a plurality of particular procedures chosen from a list consisting of: an eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

21. The apparatus of claim 20, wherein the filter reduction module further comprises: a filter approximation module, wherein the filter approximation module performs an approximation operation on one or more the plurality of filters; and a filter merging module, wherein the filter merging module merges two or more of the plurality of filters.

22. The apparatus of claim 20, further comprising: a filter processing module, wherein the filter processing module transforms one or more of the filters; and a filter grouping module, wherein the filter grouping module groups filters based on the filters proximity to one other.

23. A method for propagating filters in a publish-subscribe network, comprising the steps of:
(a) receiving, at a router, a plurality of filters at a node in the network, wherein a filter of the plurality of filters describes a set of events that a subscriber is interested in receiving;

(b) the router processing one or more of the received filters to reduce the number of filters;

(c) the router determining whether to propagate filters based on recipient behavior rules; and (d) the router propagating the processed filters to a next node in the network; wherein the router propagating includes propagating the filters using one or more of a plurality of particular procedures chosen from a list consisting of: an eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

24. The method of claim 23, further comprising: determining whether to propagate filters based on sender behavior rules.

25. The method of claim 23, further comprising the step of determining if there is another node after the next node in the network.

26. The method of claim 25, if it is determined that there is another node, repeating steps (b)-(d).

27. The method of claim 23, further comprising the step of determining if there are additional filters to be received at the next node in the network.

28. The method of claim 27, if it is determined that there are additional filters to be received at the next node in the network, repeating steps (a)-(d) at the new node.

29. The method of claim 23, wherein the processing step includes one or more of the steps of:
   simplifying the filters to remove redundant predicate expressions;
   approximating the filters;
   clustering the filters;
   subsuming the filters; and,
   merging two or more filters.

30. The method of claim 29, wherein the processing step further includes: grouping filters; and, wherein the approximating step approximates filters in the group, the clustering step locates and collects filters in the group with respect to the filters' proximity, the subsuming step subsumes filters in the group, and the merging step merges filters in the group.

31. The method of claim 30, wherein the grouping step groups filters only from downlinks relevant to a subject.

32. The method of claim 29, wherein the merging step includes determining whether a merged filter will exceed the packet leakage threshold.

33. The method of claim 23, wherein the processing step includes: approximating the filters; and, subsuming and merging the approximated filters.

34. The method of claim 23, wherein the node in the network includes stored filters and wherein the processing step process the received filters and the stored filters to reduce the number of filters.

35. The method of claim 34, wherein the stored filters are previously received and processed filters.

36. The method of claim 23, wherein the receiving step (a) receives the plurality of filters at a node in the core of the network.

37. A router for propagating filters in a publish-subscribe network, comprising modules for executing the method of claim 23.

38. A publish-subscribe network comprising a plurality of routers that include modules for executing the method of claim 23.

39. A publish-subscribe network comprising a plurality of user machines that include modules for executing the method of claim 23.

40. An apparatus for propagating filters in a publish-subscribe network, comprising:
   a filter receiving module, wherein the filter receiving module receives a plurality of filters at a node in the network, wherein a filter of the plurality of filters describes a set of events that a subscriber is interested in receiving;
   a filter processing module, wherein the filter processing module reduces the number of filters by merging one or more filters of the plurality of filters in the plurality of received filters; and,
   a filter propagation module, wherein the filter propagation module determines whether to propagate filters based on recipient behavior rules and, if determined to propagate, propagates the reduced number of filters to a next node in the network; wherein the filter propagation module includes instructions for propagating the filters using one or more of a plurality of particular procedures chosen from a list consisting of: an eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

41. The apparatus of claim 40, wherein the filter processing module includes: a simplification module, wherein the simplification module simplifies the filters to remove redundant predicate expressions.

42. The apparatus of claim 40, wherein the filter processing module includes: a grouping module, wherein the grouping module groups filters according to a selection of downlinks.

43. The apparatus of claim 40, wherein the filter processing module includes: an approximation module, wherein the approximation module approximates the filters.

44. The apparatus of claim 40, wherein the filter processing module includes: a subsumption module, wherein the subsumption module subsumes filters.

45. The apparatus of claim 40, wherein the filter processing module includes: a clustering module, wherein the clustering module clusters filters according to their proximity to each other.

46. The apparatus of claim 40, wherein the filter processing module includes: a merging module, wherein the merging module merges filters.

47. A method of filter propagation in a publish-subscribe network, comprising the steps of:
   a router sending notification requesting filters;
   one or more downstream routers receiving the notification;
   one or more of the downstream routers propagating the filter requests further downstream;
   the router requesting filters waiting for a response from the downstream routers to which the filter request is propagated;
   one or more of the downstream routers collecting filters from the further downstream routers to which the filter request is propagated;
   one or more of the downstream routers processing the propagated filters to reduce the number of filters; and,
   one or more of downstream routers sending the reduced number of filters upstream to the router requesting filters; wherein the one or more of downstream routers propagation includes propagating the filters using one or more of a plurality of particular procedures chosen from a list consisting of: an eager propagation scheme; lazy propagation scheme; response to broadcast advertisement scheme; after network topology computation scheme; periodic propagation scheme; filter re-propagation during fault repair scheme; and, filter re-propagation during network re-configuration scheme.

48. The method of claim 47, further comprising: each downstream router updating a bookkeeping database to reflect that a filter request is received from the router; and determining if the router from which the filter request is received has been serviced.

49. A publish-subscribe network comprising a plurality of routers and publisher machines that include modules for executing the method of claim 47.

* * * * *